(12) United States Patent
Toy

(10) Patent No.: US 6,191,500 B1
(45) Date of Patent: Feb. 20, 2001

(54) SYSTEM AND METHOD FOR PROVIDING AN UNINTERRUPTIBLE POWER SUPPLY TO A CRITICAL LOAD

(75) Inventor: John H. Toy, Drexel Hill, PA (US)

(73) Assignee: Kling Lindquist Partnership, Inc., Philadelphia, PA (US)

(*) Notice: Under 35 U.S.C. 154(b), the term of this patent shall be extended for 0 days.

(21) Appl. No.: 09/199,550

(22) Filed: Nov. 25, 1998

Related U.S. Application Data

(60) Provisional application No. 60/107,437, filed on Nov. 6, 1998, and provisional application No. 60/108,820, filed on Nov. 17, 1998.

(51) Int. Cl.[7] .................................................. H02J 9/00
(52) U.S. Cl. .......................... 307/64; 307/68; 307/65; 307/72
(58) Field of Search ................................ 307/43, 64, 65, 307/71, 72, 44, 66, 68

(56) References Cited

U.S. PATENT DOCUMENTS

| | | | |
|---|---|---|---|
| 3,665,203 | 5/1972 | Barnett et al. | 307/84 |
| 4,104,539 | 8/1978 | Hase | 307/64 |
| 4,114,048 | 9/1978 | Hull et al. | 307/53 |
| 4,177,389 | 12/1979 | Schott | 307/64 |
| 4,247,787 | * 1/1981 | Page | 307/112 |
| 4,465,943 | * 8/1984 | Risberg | 307/67 |
| 4,476,399 | 10/1984 | Yoshida et al. | 307/44 |
| 4,539,487 | 9/1985 | Ishii | 307/44 |
| 4,556,802 | 12/1985 | Harada et al. | 307/66 |
| 4,609,828 | 9/1986 | Small | 307/44 |
| 4,761,563 | 8/1988 | Ross et al. | 307/87 |
| 4,812,672 | 3/1989 | Cowan et al. | 307/64 |
| 4,877,972 | 10/1989 | Sobhani et al. | 307/43 |
| 5,075,565 | * 12/1991 | Severinsky et al. | 307/66 |
| 5,237,208 | * 8/1993 | Tominga et al. | 307/66 |
| 5,436,512 | 7/1995 | Inam et al. | 307/58 |
| 5,473,528 | * 12/1995 | Hirata et al. | 307/66 |
| 5,612,580 | * 3/1997 | Janonis et al. | 307/64 |
| 5,621,254 | 4/1997 | Takeda et al. | 307/64 |
| 5,646,458 | * 7/1997 | Bowyer et al. | 307/64 |
| 5,668,417 | * 9/1997 | Wiscombe et al. | 307/64 |
| 5,745,356 | * 4/1998 | Tassitino, Jr. et al. | 307/71 |
| 5,994,793 | * 11/1999 | Bobry | 307/64 |
| 5,994,794 | * 11/1999 | Wehrlen | 307/64 |

FOREIGN PATENT DOCUMENTS

| | | |
|---|---|---|
| 0 244 186 A2 | 11/1987 | (EP). |
| 0 599 814 A2 | 6/1994 | (EP). |
| WO 97/14206 | 4/1997 | (WO). |
| WO 97/50170 | 12/1997 | (WO). |
| WO 98/09359 | 3/1998 | (WO). |

OTHER PUBLICATIONS

Kusko, A., Emergency/Standby Power Systems, McGraw–Hill, 1989, pp. 7–15; 19–31; and 73–81.

Croft, T., Central Stations, third ed., McGraw–Hill, 1937, pp. 192–201; and 242–247.

Chandorkar et al. "Control of Distributed Ups Systems" pp. 197–204 (Jun. 20, 1994).

* cited by examiner

Primary Examiner—Albert W. Paladini
Assistant Examiner—Rios Roberto
(74) Attorney, Agent, or Firm—Morgan, Lewis & Bockius LLP

(57) ABSTRACT

A system and method for providing an uninterrupted supply of power to a critical load includes at least two uninterruptible power supply UPS modules that receive power from separate utility sources. A controller controls the UPS modules so that the output power from one UPS module is substantially in-phase with the output power from the other UPS module. As a result, the output powers from the UPS modules can be combined with one another to provide a sufficient source of uninterruptible power to the critical load regardless of the phase difference in the power provided by the separate utility sources.

18 Claims, 13 Drawing Sheets

SYSTEM AND METHOD FOR PROVIDING AN UNINTERRUPTIBLE POWER SUPPLY TO A CRITICAL LOAD

RELATED APPLICATIONS

This application claims the benefit of two commonly owned provisional applications: a first provisional application, entitled "Uninterruptable Power Supply System," which was filed on Nov. 6, 1998, and assigned Provisional Application No. 60/107,437; and a second provisional application, entitled "Uninterruptible Power Supply System," which was filed on Nov. 17, 1998, and assigned Provisional Application No. 60/108,820; both of which are hereby incorporated by reference.

BACKGROUND OF THE INVENTION

1. Field of the Invention

The present invention relates to a system and method for providing an uninterruptible power supply to a critical load. More particularly, the present invention relates to a system and method for providing N+2 redundancy and on-line maintenance capability in an uninterruptible power supply system with no single points of failure.

2. Discussion of the Related Art

Electric power pervades our world to such an extent that lack of it can lead to disaster, especially the financial, medical, and communications industries. As a result, standby and/or emergency power supply systems have been developed to answer the need for an uninterrupted supply of power. Typically, these so-called uninterruptible power supplies or supply systems are designed to handle a critical load during brief periods when service from a main power supply (e.g. a utility) becomes "interrupted" or unavailable. The critical load varies depending on the application and may, for example, include computer systems, communication systems, emergency lighting, life support systems, or anything whose continuous operation is necessary and/or whose interruption may prove disastrous.

Various uninterruptible power supplies have been developed and may include a battery backup system or a generator(s) for providing an alternate source of power. More complex systems may include transfer switches for selecting between alternate power sources and redundant feeds for providing alternate pathways to conduct power between the source(s) and the critical load. However, these conventional uninterruptible power supplies typically have a single point source of failure making them unsatisfactory for many important applications.

Other problems exist with respect to uninterruptible power supply systems, some of which are discussed in further detail below. A need exists for an improved uninterruptible power supply system that solves the problems described herein.

SUMMARY OF THE INVENTION

Accordingly, the present invention is directed to a system and method for providing an uninterruptible supply of power to a critical load that alleviates the problems associated with conventional uninterruptible power supply systems. In particular, an uninterruptible power supply (UPS) system of the present invention provides N+2 redundancy to the critical load in a manner in which single points of failure are eliminated.

The present invention is a UPS system that includes a plurality of UPS modules electrically coupled to at least two utility sources. A UPS paralleling switchgear is used to control the UPS modules and combine their outputs so that the output of a particular UPS module matches that of each other UPS module regardless of which utility source the particular UPS module receives power. The combined outputs of the UPS modules are provided to a ring bus. The ring bus provides multiple feeds to the critical load. The UPS system of the present invention provides an uninterruptible supply of power to the critical load.

One of the features of the present invention is that during normal operation, the critical load is supplied with power combined from at least two utility sources. In particular, two utility sources each provide power to the plurality of UPS modules. The UPS modules are controlled so that their outputs match one another regardless of the utility source driving the particular UPS module. The outputs are provided on a single bus to the critical load so that each online UPS module equally shares the critical load.

Another feature of the present invention is that the N+2 redundancy is accomplished with a reduced number of UPS modules over conventional systems. In particular, because the outputs of the UPS modules are combined onto a single bus and because either utility source can be used to power any of the UPS modules, a fewer number of UPS modules can be used to deliver the same level of redundancy.

Yet another feature of the present invention is a ring bus which provides alternate paths between the UPS modules and the critical load so that uninterrupted power is supplied to the critical load. In particular, the ring bus isolates and sectionalizes the critical load from the UPS modules so that portions of the critical load can be brought offline or serviced while still providing power to the remaining portions of the critical load.

Still another feature of the present invention is that any component in the UPS system can fail or be brought offline for servicing or maintenance without interrupting the power supplied to the critical load. This is accomplished through the various redundancy and backup systems as will be discussed in detail below.

Additional features and advantages of the present invention will be set forth in the description which follows, and in part will be apparent from the description, or may be learned by practice of the invention. The objectives and other advantages of the invention will be realized and attained by the process particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Overview

Figure 1:
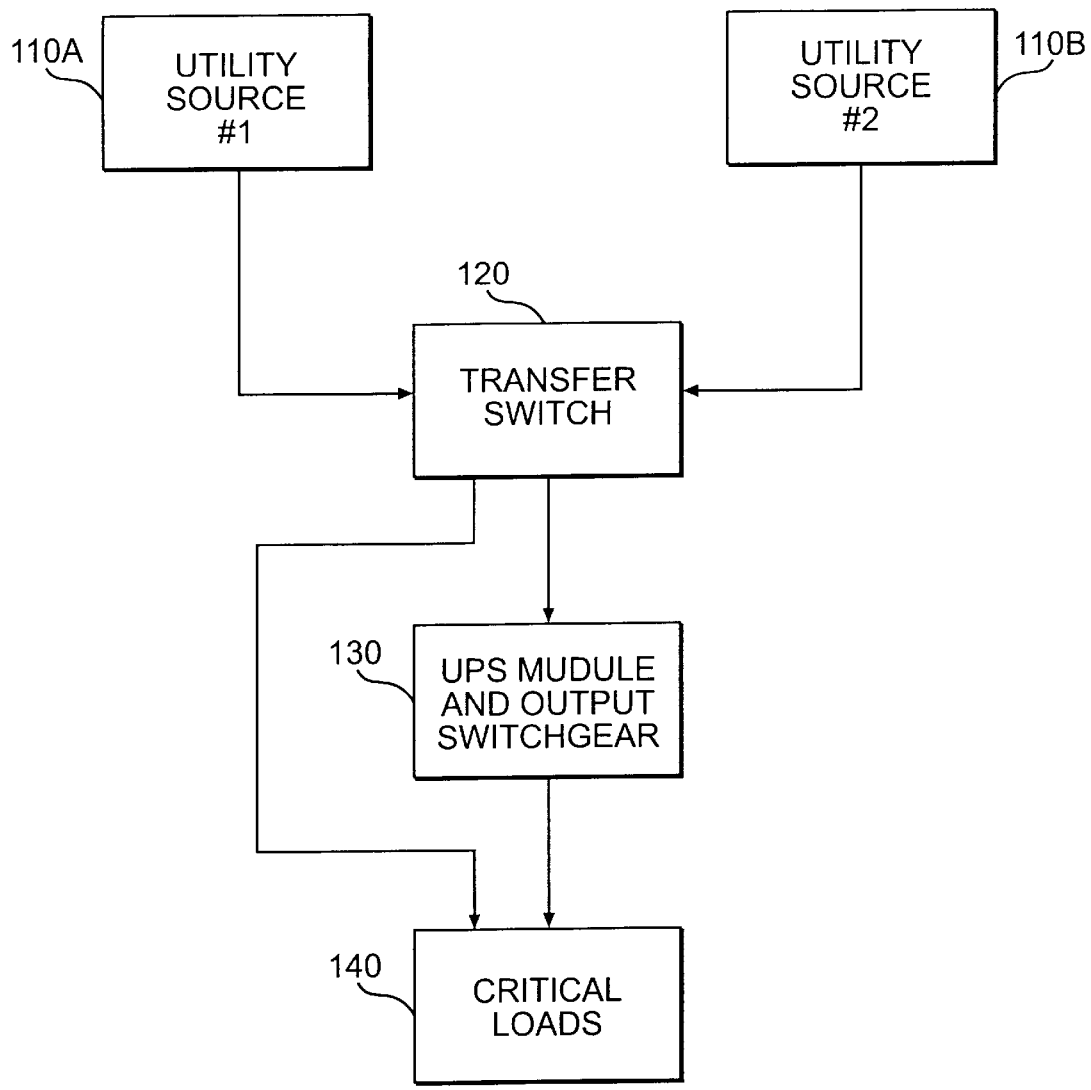
FIG. 1 illustrates a conventional uninterruptible power supply system.

FIG. 1 illustrates a conventional uninterruptible power supply (UPS) system 100. UPS system 100 includes a first or primary utility source 110A, a secondary or alternate utility source 110B, (collectively referred to as utility sources 110), a transfer switch 120, an uninterruptible power supply (UPS) module 130 and its associated output switchgear, and a critical load 140. Each of these conventional elements is now described.

Utility sources 110 may include a source of electric power generally referred to as a utility company. Such utility companies generate electric power from various combustion, nuclear, or hydromechanical processes as is well known. Other sources of electric power may be used interchangeably with utility sources 110 as would be apparent. In conventional UPS system 100, a primary utility source 110A supplies electric power to critical load 140 during normal operation. If the power supplied by primary utility source 110A should become interrupted, transfer switch 120 would detect the loss of power by various well known means and switch to alternate utility source 110B so that power would be continuously supplied to critical load 140.

UPS module 130 may comprise a battery backup system and switchgear (a static UPS system), a motor-generator system and switchgear, a combination of the two, or other such conventional devices that serve to provide continuous power to critical load 140 for brief periods of time. In particular, UPS module 130 may provide continuous power to critical load 140 during the period of time between the interruption of primary utility source 110A and the switching of transfer switch 120 to alternate utility source 110B. UPS module 130 is designed so that, as far as critical load 140 is concerned, the transfer between utility sources 110 is "bumpless."

Critical load 140 includes those loads whose operation must be continuous. Such loads may include computer systems, communication systems, life support systems, etc. While not shown in FIG. 1, conventional UPS system 100 may include other loads as well as critical load 140. These other loads may include building loads, HVAC loads, lighting loads, and various other loads whose operation may be desirable but not critical. These loads may be prioritized in conventional UPS system 100 and taken on and offline depending on power available. Typically, these loads would be online during normal operation and offline during the interruption of, for example, both utility sources 110.

One problem associated with conventional UPS system 100 is that several single points of failure exist that would result in loss of power to critical load 140. For example, if transfer switch 120 fails, no power from either utility source 110 would be supplied to downstream critical load 140. Furthermore, if UPS module 130 fails, no power from either utility source 110 would be supplied to the downstream critical load 140. In some conventional UPS systems 100, this problem may be accommodated by having a bypass from transfer switch directly to critical load 140 as shown in FIG. 1. As shown by these examples, failures at single points, particularly at transfer switch 120, result in the interruption of power to critical load 140. For certain critical loads 140, these failures are unacceptable.

Figure 2:
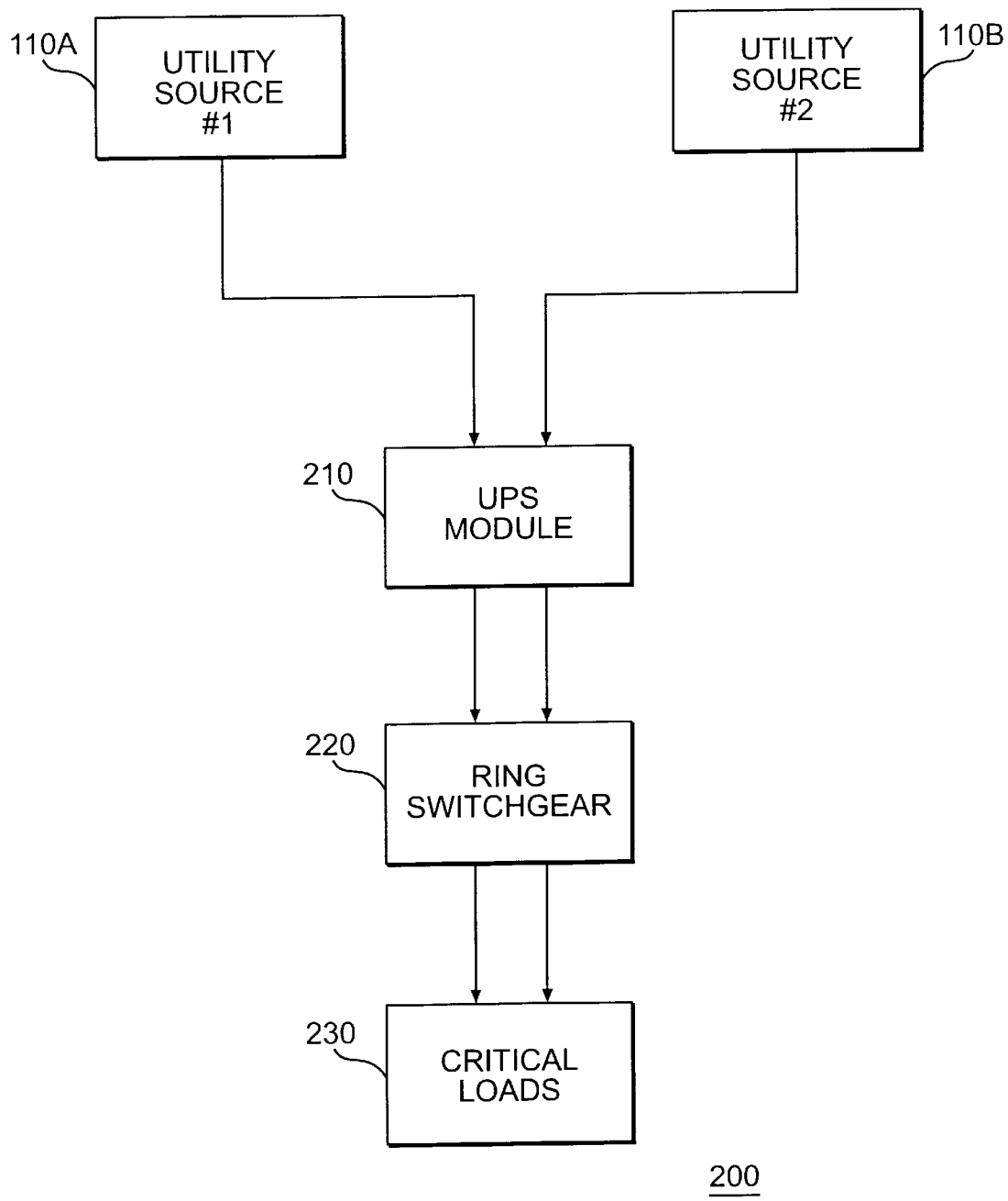
FIG. 2 illustrates an uninterruptible power supply system according to the present invention.

FIG. 2 illustrates a UPS system 200 according to the present invention. UPS system 200 includes first utility source 110A, second utility source 110B, a UPS module 210, a ring switchgear 220, and a critical load 230. During normal operation, UPS system 200 provides continuous power from both utility sources to critical load 230. In the event of a failure, UPS system 200 provides continuous power from at least one utility source 110 to critical load 230 regardless of where the failure occurred as long as at least one utility source 110 is able to supply power.

In a preferred embodiment of the present invention, utility sources 110 are separate utility companies or power grids or separate substations of a single utility company. In any case, a separate feed directly from each utility source 110 to UPS module 210 is used so that these feeds do not become a single point of failure. As would be apparent, utility source 110 is any source of electric power that is normally used provide power to critical load 230.

UPS module 210 receives power from both utility sources 110 and may also receive power from additional sources as well such as a third utility source, a generator, or other source of electric power. UPS module 210 includes a battery backup system and a motor-generator system as well as appropriate switchgear. UPS module 210 combines the power from both utility sources 110 while isolating them from critical load 230. In addition, UPS modules "clean up" the power supplied by utility sources 110. According to a preferred embodiment of the present invention, UPS module 210 includes sufficient resources to provide N+2 redundancy to critical load 230. UPS module 210 is able to provide power to critical load 230 from either, both, or none of utility sources 110 depending on the status of utility sources 110.

One of the problems associated with combining power from different utility sources 110 is that the power supplied by first utility source 110A is out-of-phase with the power supplied by second utility source 110B. For example, in one application of the present invention, power generated from a single utility company and supplied to UPS system 200 through separate substations of the utility company varied in phase by as much as 10 degrees and by 4 degrees on the average. According to the present invention, UPS module 210 includes a control loop for individually adjusting each of the motor-generators therein so that the voltage, frequency, and phase of the power supplied to critical load 230 by a particular motor-generator matches that of each other motor-generator regardless of which utility source 110 is driving the particular motor-generator.

UPS module 210 also includes a battery backup system for providing power to the motor-generators for a brief period of time in the event that power from both utility sources 110 is interrupted. The battery backup system drives the motor-generators thereby providing power to critical load 230 until power is supplied from either of the utility sources 110 or an alternate power source is brought on line.

UPS module 210 also includes mechanisms for bypassing the motor-generators and supplying power from either of utility sources 110 directly to critical load 230. This allows the motor-generators to be brought on/offline for repair, maintenance or replacement and eliminates the motor-generators as single points of failure.

Ring switchgear 220 includes a ring bus and appropriate switchgear for providing power from UPS module 210 to critical load 230. In particular, ring switchgear 220 is used to isolate failures on its ring bus so that alternate paths are provided to critical load 230. In a preferred embodiment of the present invention, at least two feeds originating at opposite portions of the ring bus supply critical load 230. In a further preferred embodiment of the present invention, at least two feeds originating at opposite portions of the ring bus supply each individual load of critical load 230. This aspect of the ring bus also allows maintenance to be performed on portions of critical load 230, or other downstream devices or aspects of UPS system 200, without having to interrupt power to the remaining portions of critical load 230.

Critical load 230 may comprise a single load, such as a single computer system, or multiple loads, such as a computer network, life support systems, and/or a communication array. As would be apparent, critical load 230 may include any combination of loads whose continuous operation is highly desirable or imperative. As mentioned above, in a preferred embodiment of the present invention, each load in critical load 230 receives power from ring switchgear 220 via at least two separate feeds or pathways so as to again eliminate any single point of failure.

One such critical load 230 may be, for example, a bank of data processing computers together with its associated cooling and ventilation equipment, that operates, manages, controls, and records transactions associated with a stock exchange, such as NASDAQ.

As would be apparent, UPS system 200 may provide power to loads other than critical load 230. These other loads may receive power through UPS module 210 or directly from either of utility sources 110. In any case, these other loads can be isolated from critical load 230 so that critical load 230 always receives preference over all other loads in receiving power.

UPS System

Figure 3:
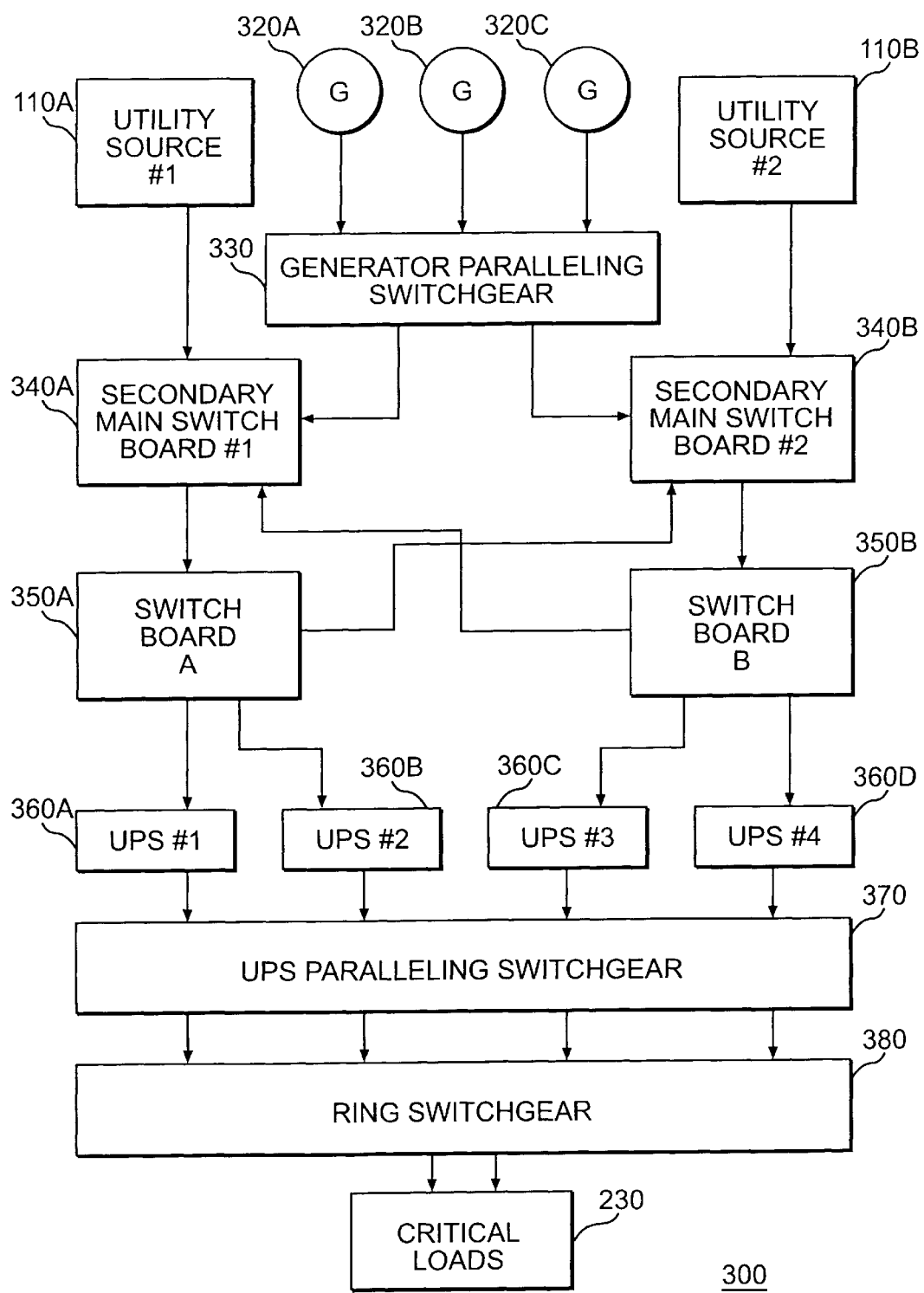
FIG. 3 illustrates an uninterruptible power supply system according to the present invention in further detail.

A preferred embodiment of the present invention is now discussed in considerably more detail with reference to FIG. 3. A UPS system 300 includes first utility source 110A, second utility source 110B, a bank of generators 320 (shown as generators 320A, 320B, and 320C), a generator paralleling switchgear (GPS) 330, a first secondary main switchboard (SSB1) 340A, a second secondary main switchboard (SSB2) 340B, a first switchboard (SBA) 350A, a second switchboard (SBB) 350B, a bank of uninterruptible power supply (UPS) modules 360 (shown as UPS modules 360A–D), a UPS paralleling switchgear (UPSSB) 370, a ring switch gear 380, and critical load 230. Although not shown in FIG. 3 to simplify illustration, UPS system 300 also includes bypass feeds that bypass UPS modules 360 between switchboard 350 and UPS paralleling switchgear 370 as will be discussed below. Each of the components of UPS system 300 will discussed in detail, followed by a discussion of the operation of UTPS system 300.

Utility Sources

According to the present invention, power is supplied to UPS system 300 via two feeders from two utility sources 110 located remotely from one another. In a preferred embodiment of the present invention, utility sources 110 feed UPS system 300 via 13.2 KV feeders. The feeder from each utility source 110 will terminate in a transformer complete with switchgear, metering section and secondary main circuit breaker. Various other types of equipment other than those described above can be used to supply power to UPS system 300 as would be apparent.

Generator Bank

In a preferred embodiment of the present invention, a bank of generators 320 is used to provide power to critical load 230 in the event that power becomes interrupted from both utility sources 110. In the preferred embodiment, the bank of generators 320 includes three 1400 kilowatt diesel generators with optional expansion to four generators. The operation, starting, and shutting down of generators 320 is performed by generator paralleling switchgear 330. Various other types of generators other than those described above can be used to accommodate different loads or generate electric power from other mechanisms as would be apparent.

Generator Paralleling Switchgear

Generator paralleling switchgear 330 includes all controls and equipment to initiate the automatic start, synchronization and paralleling of generators 320. Generator paralleling switchgear 330 also includes all necessary controls and devices to allow generators 320 to be paralleled with utility sources 110 for peak load shaving and utility load curtailment applications. Furthermore, in a preferred embodiment of the present invention, generator paralleling switchgear 330 is equipped with all necessary components to serially communicate with the Supervisory Control and Data Acquisition (SCADA) system for remote controls, monitoring and annunciations.

Figure 4:
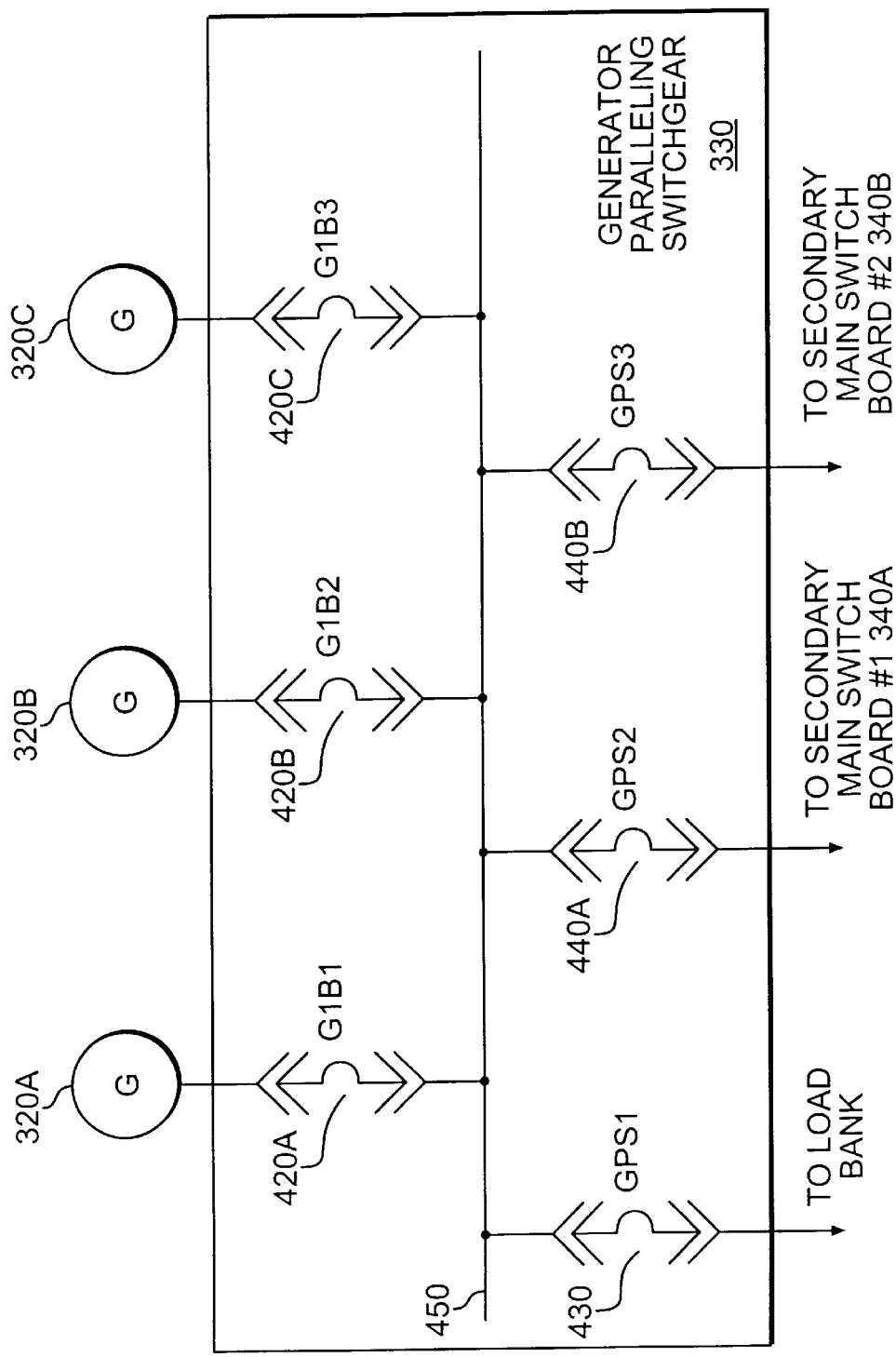
FIG. 4 illustrates circuit connections for a generator paralleling switchgear according to one embodiment of the present invention.

Generator paralleling switchgear 330, which is illustrated in FIG. 4, includes a generator bus 450 and a generator breaker 420 (shown as 420A–C) connected between each generator 320 and generator bus 450. Generator paralleling switchgear 330 also includes a load bank breaker 430 and two secondary main switchboard feeder breakers 440 (shown as 440A–B). Load bank breaker 430 connects generator paralleling switchgear 330 to a load bank (not illustrated) used for testing purposes. Feeder breaker 440A connects generator paralleling switchgear 330 to first secondary main switchboard 340A and feeder breaker 440B connects generator paralleling switchgear 330 to second secondary main switchboard 340B.

Generator paralleling switchgear 330 also includes various circuits for detecting a motoring condition, undervoltage conditions, under frequency conditions, and ground fault detectors for sensing error conditions associated with each generator 320 as would be apparent.

Generator paralleling switchgear 330 also includes an automatic synchronizer that synchronizes each oncoming generator 320 with generator bus 450. The synchronizer becomes operative when the voltage of its generator 320 reaches approximately a particular level, which in a preferred embodiment of the present invention is 75 percent of nominal. The synchronizer assumes control of generator 320 to rapidly match the voltage, frequency and phase angle of the generator with that of generator bus 450 and to close generator breaker 420 with a minimum of disturbance to generator bus 450. Once generator breaker 420 is closed and generator 320 is driving generator bus 450, the synchronizer automatically goes into an idle state.

The automatic synchronizer includes a differential voltage detector that compares the voltage of the oncoming generator 320 to that of generator bus 450. If the voltage is not within a particular tolerance, which in a preferred embodiment is adjustable and set at plus or minus 5 percent, the voltage detector locks out generator breaker 320 and simultaneously initiate adjustment of the voltage. When the voltage of the oncoming generator 320 is within the particular tolerance, the lockout is removed.

The automatic synchronizer also includes a differential frequency detector that compares the frequency of the oncoming generator 320 to that of generator bus 450. If the frequency is not within a particular tolerance, which in the preferred embodiment is adjustable and set at plus or minus 0.2 Hz, the frequency detector locks out generator breaker 320 and simultaneously initiates adjustment of the frequency. When the frequency of the oncoming generator 320 is within the particular tolerance, the lockout is removed.

The automatic synchronizer also includes a differential phase detector that compares the phase of the oncoming generator 320 to that of generator bus 450. After the voltage and frequency of the oncoming generator 320 are within their respective tolerances, the relative phase angle between the oncoming unit and the bus is determined. As the relative phase angle reaches 5 degrees approaching 0 degrees, generator breaker 420 closes to initiate paralleling. The automatic synchronizer operates so that the maximum relative phase angle at the instant of paralleling does not exceed 5 electrical degrees.

Generator paralleling switchgear 330 also includes a solid-state discriminator circuit that provides for first-up, first-on operation of generators 320. This device positively prevents more than one of generators 320 from being simultaneously connected to a dead generator bus 450. After initiating the first generator 320 onto generator bus 450, the discriminator circuit shall shift the control of the remaining generators 320 to automatic or manual synchronizing at the operator's discretion.

Generator paralleling switchgear 330 also includes time delay circuits that provide for unloaded cool-down and for failure to synchronize. The cool-down time delay, which is adjustable from 0 to 15 minutes and set at 15 minutes in a preferred embodiment, is automatically bypassed for malfunction and manual shutdown of generators 320. The failure to synchronize time delay, which is adjustable from 0 to 120 seconds and set at 30 seconds in a preferred embodiment, provides audible and visual indication but does not terminate synchronizing attempts or shut own generator 320.

Generator paralleling switchgear 330 also includes various devices and mechanisms for automatically starting, protecting and monitoring each generator 320 as would be apparent.

Generator paralleling switchgear includes a switch for operating each generator 320 in one of five modes: "LOCKOUT/RESET," "OFF," "AUTO," "RUN OFF-LINE," and "RUN ON-LINE."

In the "LOCKOUT/RESET" mode, generator 320 is locked out. Whenever the switch indicates the "LOCKOUT/RESET" mode while generator 320 is operating, generator 320 immediately shuts down and its corresponding generator breaker 420 is opened. Local starting of generator 320 is permitted only when in this mode.

In the "OFF" mode, generator 320 is taken out of service. Whenever the switch indicates the "OFF" mode while generator 320 is operating, the corresponding generator breaker 420 is opened but generator 320 continues to operate to cool down before shutting down.

In the "AUTO" mode, generator 320 is on standby and starts whenever a power failure signal is given from the automatic system. When power from utility sources 110 returns and the transfer system signals generator 320 to shut down, generator breaker 420 is opened and generator 320 continues to operate to cool down before shutting down.

In the "RUN OFF-LINE" mode, a "Engine Remote-Local Run" selector switch will be activated. If this selector switch is in the "Remote" position, generator 320 start and runs as if a start signal were received, except that it shall not be connected to generator bus 450 unless a start signal is received. If this selector switch is in the "Local" position, local control buttons operate to allow generator 320 to be started or stopped, but generator 320 will not be connected to generator bus 450 unless a start signal is received. When the switch is returned to the "AUTO," generator 320 continues to operate to cool down before shutting down.

In the "RUN ON-LINE" mode, generator 320 shall start, run and connect to generator bus 450 as if a start signal were received When the switch is returned to "AUTO," the circuit breaker shall open and generator 320 continues to operate to cool down before shutting down. This mode is used for manual paralleling of generators 320.

Generator paralleling switchgear 330 includes mechanisms for automatically or manually operating generators 320. The automatic synchronizer automatically operates generators 320 as described above. When manual operation is desired, the automatic synchronizer is disconnected and synchronizing is accomplished manually as would be apparent.

Generator paralleling switchgear 330 includes a load priority and load shedding control system that adds or reduces the load on generator bus 450. Each load in UPS system 300 has a preassigned KW/KVA rating. These assigned ratings are used by the control system to determine how many loads can be added as generators 320 come onto generator bus 450.

As generators 320 are randomly connected to generator bus 450, the control system signals for connection of the loads in ascending sequential priority, with the highest priority load being connected first. All load-add steps are preceded by a time delay, adjustable from 0 to 3 seconds.

If a generator 320 fails or an overload condition exists on generator bus 450, the load shedding control system signals for the disconnection of the lowest priority loads. After the overload condition is diminished and generator bus 450 is stabilized, the control system determines the reserve capacity of generator bus 450 and signals for reconnection of loads if the load, prior to being disconnected, is determined to be within the reserve capacity. Manual operation of the load-shed and load-add is also possible.

Once all generators 320 have been paralleled to generator bus 450 and all loads connected, an adjustable stabilization time delay, which in a preferred embodiment is 180 seconds, is initiated. After the expiration of the stabilization time delay, generator paralleling switchgear 330 begins operating in a load demand mode. In this mode, the connected load on generator bus 450 is sensed to determine the number of generators 320 required to drive generator bus 450 so that, in a preferred embodiment, the on-line reserve capacity (i.e., the reserve capacity of the "on-line" generators 320) is greater than 10 percent and less than 120 percent of that of a single generator 320.

Upon sensing that the on-line reserve capacity has increased to a predetermined level, which in a preferred embodiment of the present invention is 120 percent or more of a single generator 320, a second adjustable time delay, which in the preferred embodiment is 180 seconds, is initiated. If the on-line reserve capacity stays above the predetermined level for the duration of this second time delay, generator breaker 420 corresponding to the last order generator 320 is opened and generator 320 continues to operate to cool down prior to shutting down.

Upon sensing that the connected load has decreased the on-line reserve capacity to a second predetermined level, which in the preferred embodiment is 10 percent or less, a third adjustable time delay, which in the preferred embodiment is 10 seconds, is initiated. If the on-line reserve capacity stays below the second predetermined level for the duration of the third adjustable time delay, generator paralleling switchgear 330 initiates the starting and paralleling of the next generator 320 in sequence. If, during the third time delay period, the on-line reserve capacity decreases to 0 or less (signifying bus overload), the third time delay is bypassed, and the next generator 320 in sequence is immediately started and paralleled onto generator bus 450. At the same time, loads are shed according to the priority scheme so that the connected load is reduced to equal the full load capacity of generator 320 on line. When the next generator 320 is paralleled to generator bus 450, the shed load is reconnected. Should the next generator 320 in sequence have its engine control switch in the "OFF" position or fail to synchronize within the preset time delay of the "fail to synchronize" timer, the next generator 320 in sequence is started.

If, while operating in the load demand mode, one of generators 320 fails, the failed generator 320 is removed from generator bus 450 and loads shed as discussed above. If this occurs, all idle generators 320 are started and paralleled. The stabilization time delay is reinitiated after all available sets have been connected to the bus and, upon its expiration, load demand operation is resumed.

In a preferred embodiment of the present invention, a programmable logic controller (PLC) is used to coordinate the overall generator and load control functions of generator paralleling switchgear 330. The PLC monitors and controls the performance of the individual microprocessor-based control modules within each generator 320 as would be apparent. The PLC also provides coordinated control of each generator 320 in standby, peak-shaving or load curtailnent modes of operation as would be apparent.

Secondary Main Switchboard

Figure 5:
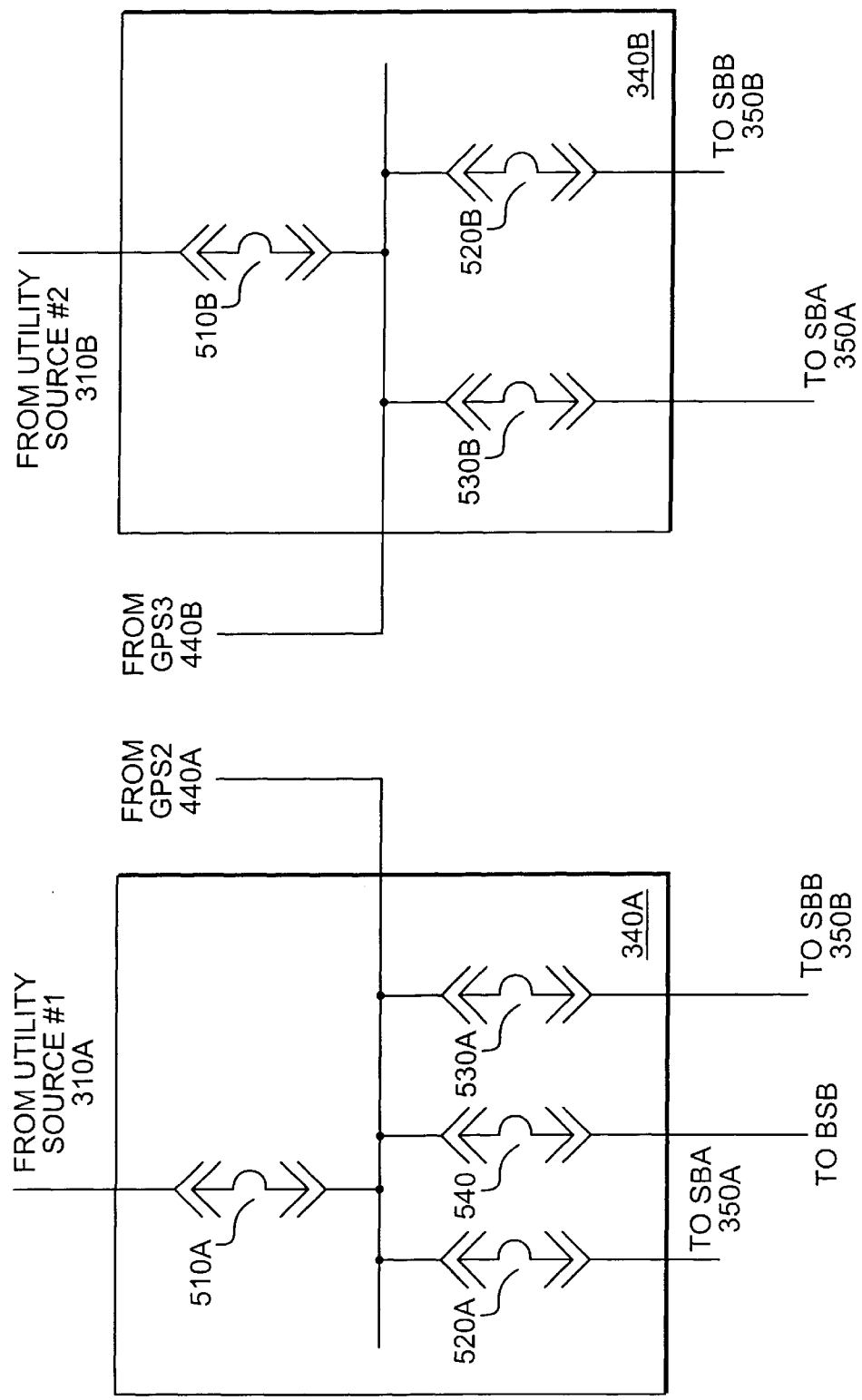
FIG. 5 illustrates circuit connections for secondary main switchboards according to one embodiment of the present invention.

The feeds from utility sources 110 terminate at either first secondary main switchboard 340A or second secondary main switchboard 340B as shown in FIG. 3. FIG. 5 illustrates the secondary main switchboards 340 in further detail.

Each secondary main switchboard includes a main breaker 510 (shown as 510A and 510B), a feeder breaker 520 (shown as 520A and 520B), an alternate feeder breaker 530 (shown as 530A and 530B), and other breakers (not shown) that supply various loads as would be apparent. In addition, first secondary main switchboard includes a bypass switchboard (BSB) feeder breaker 540.

In the preferred embodiment of the present invention, first secondary main switchboard 340A supplies power to first switchboard 350A via feeder breaker 520A, supplies power to second switchboard 350B via alternate feeder breaker 530A, supplies power to a BSB switchboard (discussed below), and supplies power to a chiller, a cooling tower, and associated pumps via other breakers not shown.

In the preferred embodiment of the present invention, second secondary main switchboard 340B supplies power to second switchboard 350B via feeder breaker 520B, supplies power to first switchboard 350A via alternate feeder breaker 530B and supplies power to additional chillers, cooling towers, their associated pumps, and all other building loads and non-essential loads via other breakers not shown.

During normal operation, main breakers 510 will be closed and alternate feeder breakers 530 will be open and interlocked to one another to prevent both main breakers 510 and alternate feeder breakers 530 from being closed simultaneously. Feeder breakers 520 will be closed to provide power to their specific switchboard 350. BSB feeder breaker 540 is normally opened.

As will be discussed in further detail below, if one of utility sources 110 fails, the corresponding main breaker 510 will be opened and the corresponding alternate feeder breaker 530 closed thereby providing power from the other utility source. For example, if utility source 110A fails, main breaker 510A would open and alternate feeder breaker 530A would close thereby providing power from utility source 110B to first switchboard 340A via second switchboard 340B.

In the event that both utility sources 110 fail, both main breakers 510 would open and power from generator paralleling switchgear 330 would be supplied to switchboards 340 as illustrated in FIG. 5 and discussed in further detail below.

Switchboards

Figure 6:
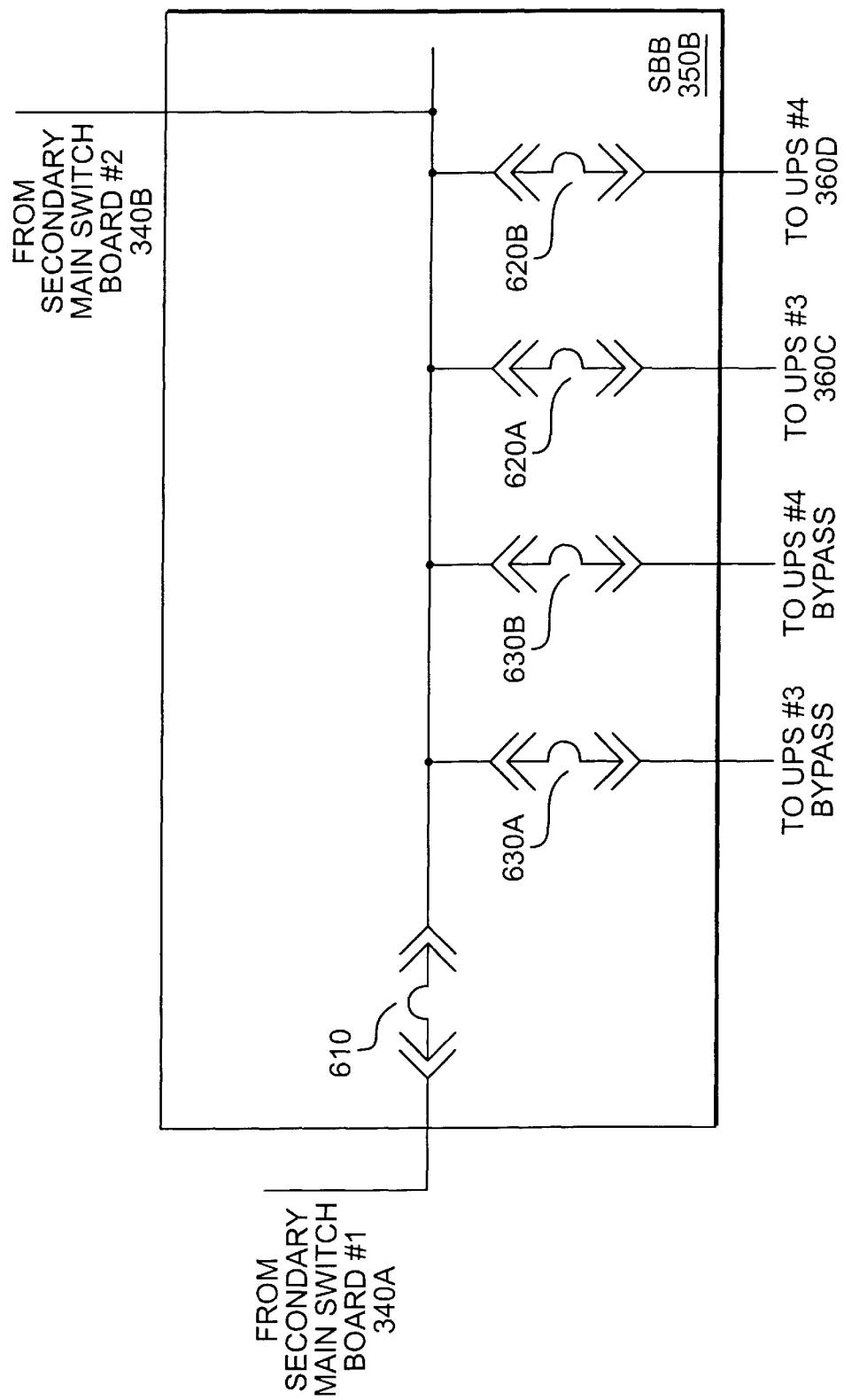
FIG. 6 illustrates circuit connections for a second switchboard according to one embodiment of the present invention.
Figure 7:
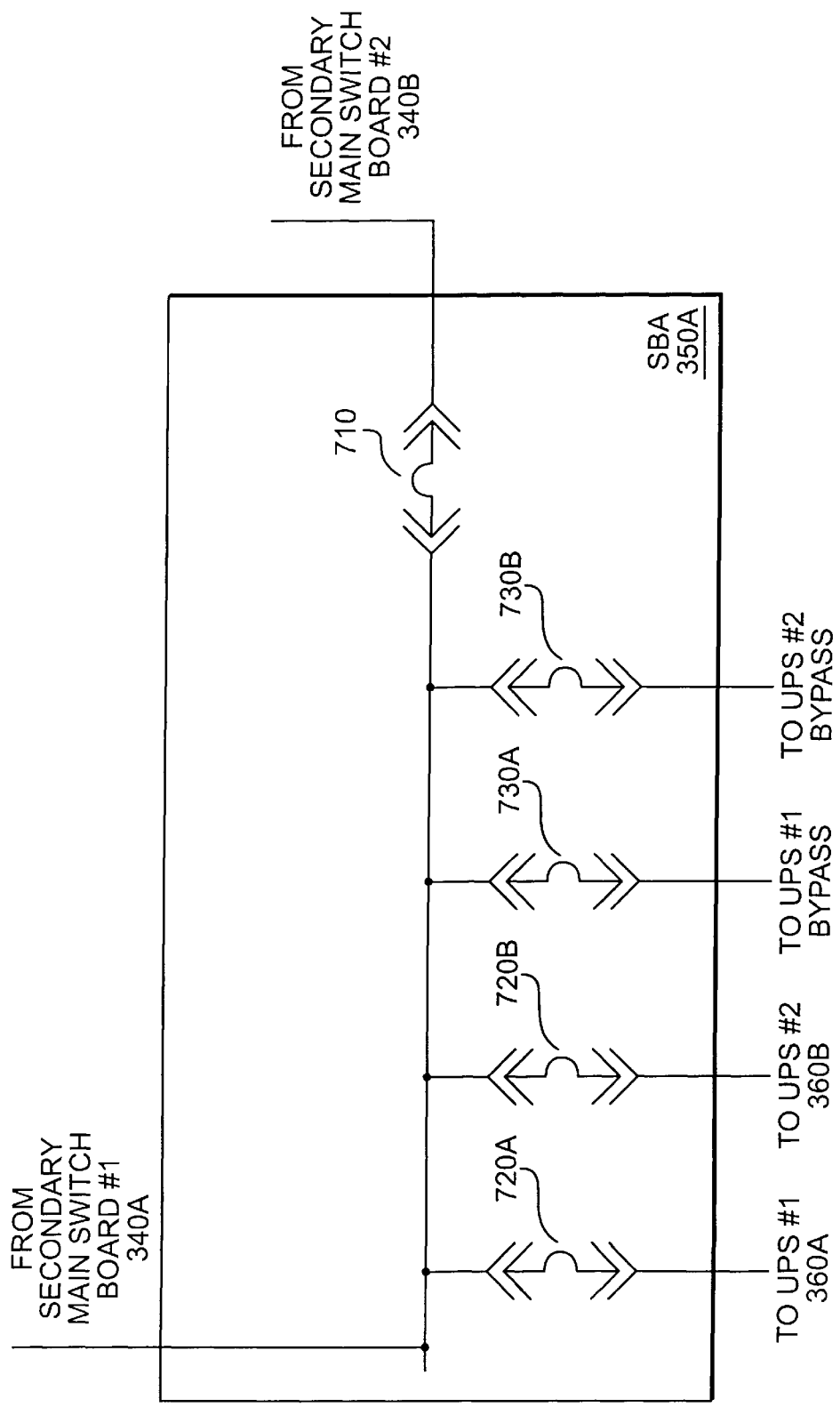
FIG. 7 illustrates circuit connection for a first switchboard according to one embodiment of the present invention.

The respective feeds from secondary main switchboards 340 each terminate at either first switchboard 350A or second switchboard 350B as shown in FIG. 3. FIG. 7 illustrates first switchboard 350A in further detail. FIG. 6 illustrates second switchboard 350B in further detail.

As illustrated in FIG. 7, first switchboard 350A includes a tie breaker 710, two UPS feeder breakers 720 (shown as UPS feeder breakers 720A–B), two UPS bypass breakers 730 (shown as UPS bypass breakers 730A–B). First switchboard 350A normally receives power from first secondary main switchboard 340A and alternatively, from second secondary main switchboard 340B as discussed above. Tie breaker 710 is used to isolate first switchboard 350A from second secondary main switchboard 340B during maintenance operations.

UPS feeder breaker 720A is used to provide power from first switchboard 350A to a first UPS module 360A. UPS feeder breaker 720B is used to provide power from first switchboard 350A to a second UPS module 360B. UPS bypass breaker 730A is used to bypass UPS module 360A and UPS bypass breaker 730B is used to bypass UPS module 360B. The bypassing mechanism is discussed in further detail below. In this manner, during normal operation, power from utility source 110A is used to provide power to UPS modules 360A and 360B.

A similar discussion applies to second switchboard 350B. As illustrated in FIG. 6, second switchboard 350B includes a tie breaker 610, two UPS feeder breakers 620 (shown as UPS feeder breakers 620A–B), two UPS bypass breakers 630 (shown as UPS bypass breakers 630A–B). Second switchboard 350B normally receives power from second secondary main switchboard 340B and alternatively, from first secondary main switchboard 340A as discussed above. Tie breaker 610 is used to isolate second switchboard 350B from first secondary main switchboard 340A during maintenance operations.

UPS feeder breaker 620A is used to provide power from second switchboard 350B to a third UPS module 360C. UPS feeder breaker 620B is used to provide power from second switchboard 350B to a fourth UPS module 360D. UPS bypass breaker 630A is used to bypass UPS module 360C and UPS bypass breaker 630B is used to bypass UPS module 360D. The bypassing mechanism is discussed in further detail below. In this manner, during normal operation, power from utility source 110B is used to provide power to UPS modules 360C and 360D.

Although not illustrated in FIG. 6 or FIG. 7, both switchboards 350 include additional breakers and supply power to additional loads in UPS system 300 as would be apparent. In a preferred embodiment of the present invention, these loads include essential loads that are not included in critical load 230, but whose operation is desirable based on available power and are prioritized accordingly.

Uninterruptible Power Supplies

In a preferred embodiment of the present invention, UPS system 300 includes four UPS modules 360 (shown as UPS modules 360A–D in FIG. 3) to supply regulated alternating current (ac) power to critical load 230. In particular, this embodiment was designed to provide 1500 KVA power to critical load 230 with N+2 redundancy. In other words, N UPS modules 360 are required to handle critical load 230 with two additional UPS modules 360 used as spares or backups. In this embodiment, each UPS module 360 provides 750 KVA. Thus, two UPS modules 360 are required to handle critical load 230 with the additional two UPS modules 360 used to provide the requisite redundancy. As would be apparent, other numbers of UPS modules 360 could be used depending on critical load 230 and the desired redundancy. UPS modules 360 together with UPS paralleling switchgear 370 provide unattended parallel operation to ring bus switchgear 370.

Each UPS module 360 includes a power conditioning assembly designed to operate in parallel to provide precise regulated AC power to one percent non-linear loads that might include, for example, multiple computers and other associated gear.

Figure 10:
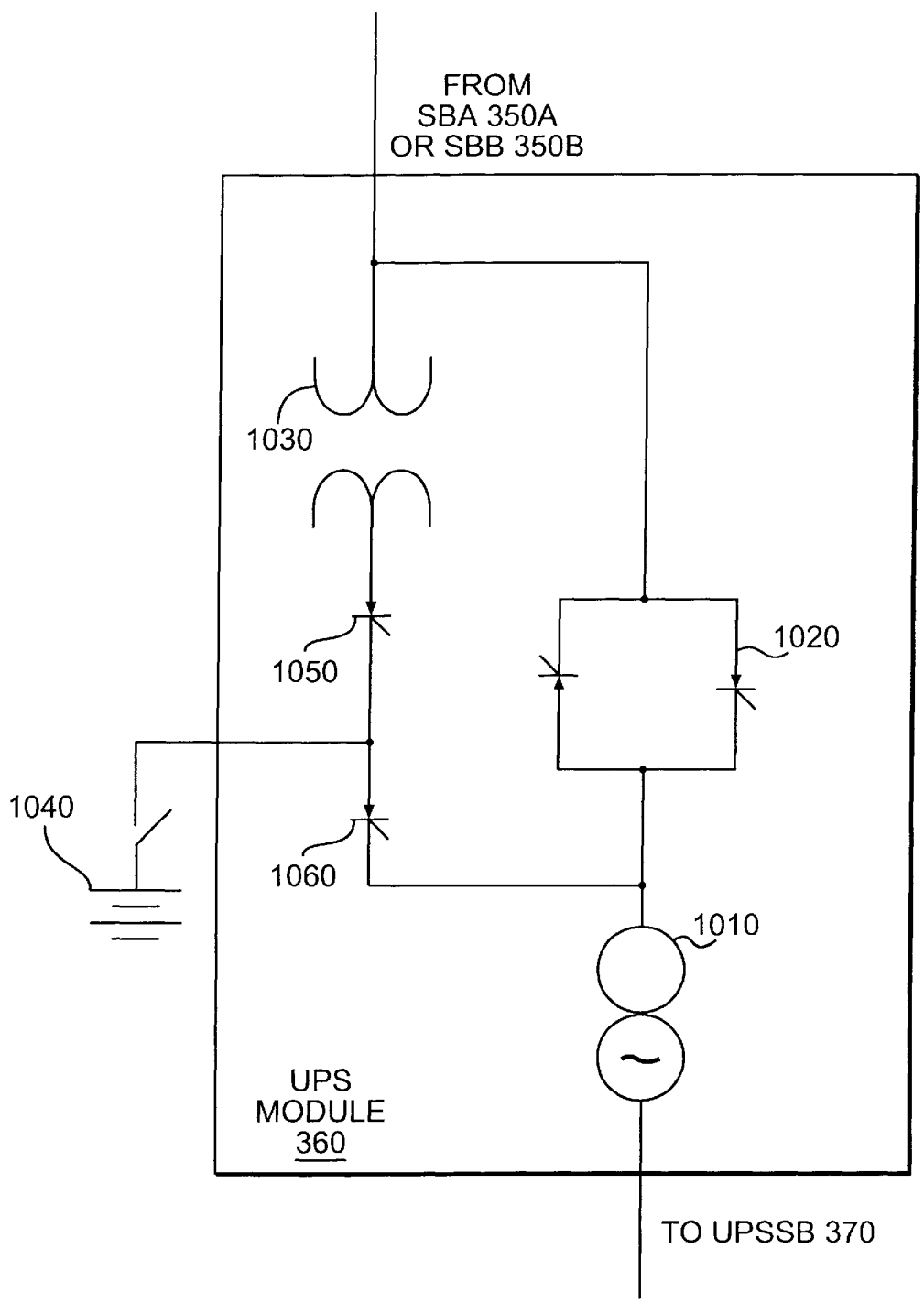
FIG. 10 illustrates a UPS module according to one embodiment of the present invention.

FIG. 10 illustrates a single UPS module 360 in further detail. UPS module includes a motor-generator 1010, a rectifier-inverter package (shown as rectifier 1050 and inverter 1060), an isolation transformer 1030, a static switch 1020, and one or more batteries 1040. Rectifier-inverter package 1050/1060 and motor-generator 1010 operate to provide precise regulated 60 Hz AC power to UPS paralleling switchgear 370. UPS module 360 also includes an exciter, voltage regulators, controls, protective devices, monitoring panels, a starting device, motor, solid-state inverter bypass device and accessories as would be apparent.

Rectifier-inverter package 1050/1060 includes a solid-state device capable of supplying regulated DC power to a solid-state device which inverts DC power to regulated AC power as required by motor-generator 1010. In turn, motor-generator 1010 supplies precise regulated 60 Hz power to UPS paralleling switchgear 370.

In addition, batteries 1040 associated with each UPS module 360 provide short-term backup power to motor-generator 1010 so that power can be supplied to critical load 230 without interruption. Batteries 1040 include the necessary charging apparatus so that they remain fully charged during normal operation and are available should an interruption occur.

In normal operation, power from utility sources 110 is supplied to UPS module 360 through rectifier-inverter package 1050/1060 to motor-generator 1010. A portion of the power is used to float-charge batteries 1040.

In the event of disruption of power from utility sources 110, inverter 1060 draws dc power from batteries 1040 without requiring any switching. At the same time, an alarm is sounded to alert operating personnel, allowing startup of a secondary power source or orderly shutdown of critical load 230. Batteries 1040 power inverter 1060 at full load for the specified time, which in the preferred embodiment of the present invention is fifteen minutes. If power from utility sources 110 returns before batteries 1040 discharge, motor-generator 1010 and inverter 1060 are powered by utility sources 110 and batteries 1040 are recharged at a controlled rate. During the loss of power from utility sources 110, the frequency is controlled by an internal oscillator. Static switch 1020 prevents reverse power flow from motor-generator 1010 to other upstream parasitic loads.

Should power from utility sources 110 fail to return before batteries 1040 discharge, UPS module 360 disconnects from critical load 230 to safeguard batteries 1040.

Each UPS module 360 is capable of being manually taken off critical load 230 for maintenance without disturbing critical load 230. When all of UPS modules 360 are taken off-line, UPS system 300 connects critical load 230 directly to a bypass source through bypass breakers 630, 730 on switchboards 350. In a preferred embodiment of the present invention, bypass source is one or both of utility sources 110. Each UPS module 360 can be taken off the bypass source and returned to normal operation either automatically or manually when it is back on-line.

UPS system 300 also connects critical load 230 directly to the bypass source in the event that the available UPS modules 360 (i.e., those UPS modules 360 that have not failed or are otherwise offline for maintenance) are unable to supply critical load 230.

The following describes various parameters associated with each UPS module 360 according to a preferred embodiment of the present invention. Unless stated otherwise, all parameters listed are under full output at 0.9 power factor, with batteries fully charged and floating on the dc bus and with nominal input voltage. Each UPS module 360 has a capacity of 750 KVA and 675 KW.

Batteries 1040 have a discharge time of 15 minutes, at 77 degrees F under full load. Batteries 1040 are lead calcium with a specific gravity of 1.215 specific gravity when fully charged. Batteries 1040 include 240 cells each having a float voltage of 2.17 to 2.26 volts to supply a total of 500 volts.

The AC input to each UPS module 360 is 3-phase, 480 volts line-to-line plus 10 percent, minus 15 percent, without affecting battery-float voltage or output voltage at 60 Hz, plus or minus 5 percent.

The AC output from each UPS module 360 is 3-phase, 480 volts line-to-line. The voltage regulation with a balanced load is plus or minus 1.0 percent. With a 50 percent load imbalance, the load regulation, phase-to-phase, is plus or minus 2 percent. The no-load voltage modulation is plus or minus 0.5 percent. Voltage drift is plus or minus 1 percent over any 30-day interval at stated ambient conditions. The frequency is 60 Hz, plus or minus 0.1 percent with plus or minus 0.1 percent drift over any 24-hour interval at stated ambient conditions. The power factor can range from 1.0 to 0.8 lagging. The phase displacement is plus or minus 1 degree of bypass input with a balanced load and plus or minus 3 degrees with a 50 percent load imbalance, phase-to-phase. The wave-form deviation factor is 5 percent at no load. Overload (at full voltage) is 110 percent load for 2 hours, 125 percent load for 10 minutes, 150 percent load for two minutes, and 300 percent load, momentary. The current limit is 150 percent full-load current at reduced voltage. Each UPS module 360 is 92 percent efficient at full load.

Inverter 1060 is a load commutated solid-state device capable of accepting power from the dc bus and providing ac power within specified limits to power motor-generator 1010. Inverter 1060 controls the motor speed, varies the speed of the motor, adjusts for different power sources, and continuously drives the generator in parallel operation with other generators 1010.

If the source frequency varies more than 0.5 Hz or the voltage varies greater than plus or minus 10 percent, static switch 1020 opens, allowing inverter 1060 to carry full power to motor-generator 1010. Commutation is provided to the SCR by the back EMF of motor-generator 1010. This power path operates to 57 Hz and minus 20 percent voltage. Upon restoration of source voltage and frequency, static switch 1020 closes.

Static switch 1020 is designed to normally be gated closed continuously to allow the normal power source to flow through motor-generator 1010. During voltage variance of plus 10 percent or frequency shift greater than plus 0.5 Hz, static switch 1020 is gated open and power to motor-generator 1010 flows through rectifier-inverter package 1050/1060 to motor-generator 1010. Upon restoration of power from utility sources 110, static switch 1020 is gated closed and provides the power to motor-generator 1010.

Each UPS module 360 includes an automatic bypass transfer scheme. This scheme, which includes the use of a make-before-break circuit breaker tandem, connects critical load 230 to the bypass source when a malfunction occurs in UPS module 360, when critical load 230 exceeds the power output rating for the stated durations, or when UPS module 360 is to be shut down manually. The breaker tandem includes three parts: an electro-mechanical input breaker, an electro-mechanical bypass breaker, and an electro-mechanical module output disconnect breaker.

Under normal conditions, the bypass breaker is off. If a malfunction in UPS module 360 occurs, a sensing circuit causes the bypass breaker to close, followed by the opening of the input breaker. The electro-mechanical module output breaker then opens to isolate UPS module 360. The bypass breaker carries the load immediately upon closing. This sequence of events is automatically controlled to assure uninterrupted transfer to the bypass power source.

Manual transfer may be also be accomplished from a control panel, which operates the electro-mechanical bypass and module output breaker in make-before-break sequence so as not to interrupt power to the critical load bus as would be apparent. Manual transfer occurs, for example, to initiate servicing.

UPS Paralleling Switchgear

Figure 8:
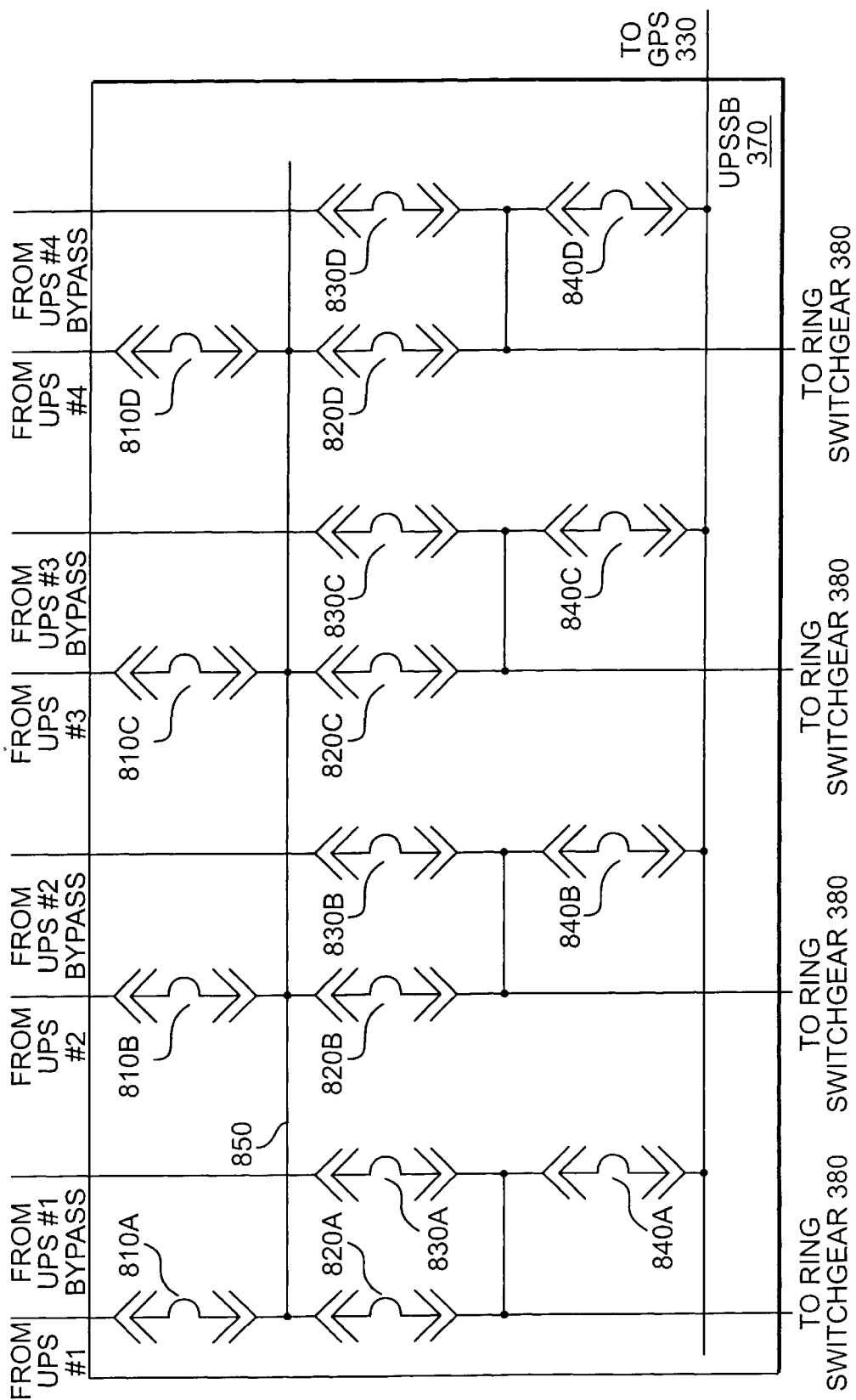
FIG. 8 illustrates circuit connections for a UPS paralleling switchgear according to one embodiment of the present invention.

FIG. 8 illustrates UPS paralleling switchgear 370 in further detail. As illustrated in FIG. 8, UPS paralleling switchgear 370 includes a UPSSB bus 850 and four sets of breakers, one corresponding to each UPS module 360 in UPS system 300. Each set of breakers includes a UPS output breaker 810 (shown as 810A–D), a UPSSB output breaker 820 (shown as 820A–D), a UPS bypass breaker 830 (shown as 830A–D), and a load bank breaker 840 (shown as 840A–D).

UPS output breakers 810 couple the output of UPS module 360 to UPSSB bus 850. UPSSB output breakers couple UPSSB bus 850 to ring switchgear 380. UPS bypass breakers 830 couple UPS bypass lines from switchboards 350 to ring switchgear 380. Load bank breakers 840 couple generator paralleling switchgear 330 to the load bank for testing purposes.

In addition to the elements illustrated in FIG. 8, in a preferred embodiment of the present invention, UPS paralleling switchgear 370 includes all controls and equipment to initiate the synchronization and paralleling of four UPS modules 360 (with expansion to six) to provide conditioned power to a ring switchgear 380. UPS paralleling switchgear 370 also includes all necessary control and devices to allow the UPS modules 360 to be paralleled with each other or to operate in single fashion with any load. In a preferred embodiment of the present invention, UPS paralleling switchgear 370 includes all necessary components to serially communicate with a Supervisory Control and Data Acquisition (SCADA) system for remote controls, monitoring and annunciations and is controlled by a programmable logic controller (PLC), although other communication mechanisms and control electronics are available as would be apparent.

UPS paralleling switchgear 370 includes various circuits for detecting motoring conditions, undervoltage conditions, ground faults, etc., as well as an automatic synchronizer for synchronizing each of motor-generators to UPSSB bus 850. In particular, the automatic synchronizer rapidly matches the voltage, frequency and phase angle of motor-generator 1010 with UPSSB bus 850 and closes UPS output breaker 810 with a minimum of disturbance to UPSSB bus 850. In particular, the automatic synchronizer controls the individual UPS modules 360 so that they can be paralleled onto UPSSB bus 850 even though they are powered from different utility sources 110. In conventional systems where UPS modules 360 are powered from a single utility source 110, a conventional UPS paralleling switchgear would only have to adjust the output phase of a motor-generator 1010 by plus or minus 1 degree to match the phase of a UPSSB bus.

However, in one embodiment of the present invention, it was discovered that the phase difference between the two utility sources 110 varied on average by 4 degrees with occasional fluctuations to 10 degrees. In order to match the phases between the various UPS modules 360 powered by different utility sources 110, the stators in motor-generators 1010 are mechanically preadjusted by a predetermined amount so that the output provided from motor-generator 1010 is purposely out-of-phase with the input by a corresponding amount. In the preferred embodiment of the present invention, the stators are adjusted to be 4 degrees out-of-phase with the poles to provide the requisite phase difference. This mechanical preadjustment in motor-generators 1010 is sufficient to match the output phases of UPS modules 360 powered by different utility sources 110 on UPSSB bus 850.

The automatic synchronizer includes a differential voltage detector that compares the voltage of the oncoming motor-generator to that of UPSSB bus 850. If the voltage is not within a particular tolerance, which in a preferred embodiment is adjustable and selected at plus or minus 5 percent, the voltage detector shall lock out UPS output breaker 810 and simultaneously initiate adjustment of the voltage of motor-generator. When the voltage of the oncoming generator voltage is within the acceptable tolerance, the lockout shall be removed.

The automatic synchronizer also includes a differential frequency detector that compares the frequency of the oncoming motor-generator to that of UPSSB bus 850. If the frequency is not within a particular tolerance, which in a preferred embodiment is adjustable and selected at plus or minus 0.2 Hz, the frequency detector shall lock out UPS output breaker 810 and simultaneously initiate adjustment of the frequency of motor-generator. When the frequency of the oncoming motor-generator is within the acceptable tolerance, the lockout shall be removed.

The automatic synchronizer also includes a phase detector that compares the phase of the oncoming motor-generator to that of UPSSB bus 850. After the voltage and the frequency of the oncoming motor-generator are within the tolerance of UPSSB bus 850, the relative phase angle between the oncoming unit and UPSSB bus 850 is measured. Once the relative phase angle reduces to 5 degrees approaching 0 degrees, UPSSB output breaker 820 closes to initiate paralleling onto ring bus 920. In a preferred embodiment of the present invention, the automatic synchronizer functions in such a manner as to ensure that the maximum relative phase angle at the instant of paralleling does not exceed 5 electrical degrees.

UPS paralleling switchgear 370 also includes a solid-state discriminator circuit that provides for first-up, first-on operation of motor-generator 1010. This device positively prevents more than one of motor-generators 1010 from being simultaneously connected to a dead UPS SB bus 850. After initiating the first motor-generator onto UPSSB bus 850, the discriminator circuit shall shift the control of the remaining motor-generators to automatic or manual synchronizing at the operator's discretion.

UPS paralleling switchgear 370 also includes adjustable time delay circuits for detecting failure by motor-generator to synchronize with UPSSB bus 850. The failure to synchronize within the time delay provides audible and visual indications but does not terminate synchronizing attempts nor shut down motor-generator 1010.

UPS paralleling switchgear 370 also includes an operator selectable switch for selecting either automatic or manual operation. In automatic operation, synchronizing is automatically accomplished by the automatic synchronizer as described above. In manual operation, the automatic synchronizer is disconnected and synchronizing is accomplished manually through controls by the operator as would be apparent.

Once all motor-generators have been paralleled to UPSSB bus 850 and all loads connected, an adjustable stabilization time delay, which in a preferred embodiment is 180 seconds, is initiated. After the expiration of the stabilization time delay, UPS paralleling switchgear 370 begins operating in a load demand mode. In this mode, the connected load on UPSSB bus 850 is sensed to determine the number of motor-generators required to drive UPSSB bus 850 so that the on-line reserve capacity can be reduced to less than that of a single UPS module 360.

Upon sensing that the on-line reserve capacity has increased to a predetermined level, which in a preferred embodiment of the present invention is 120 percent or more of a single UPS module 360, a second adjustable time delay, which in the preferred embodiment is 180 seconds, is initiated. If the on-line reserve capacity stays above the predetermined level for the duration of this second time delay, UPS output breaker 810 for the last order UPS module 360 is opened and the UPS module 360 shut down.

Upon sensing that the connected load has decreased the on-line reserve capacity to a second predetermined level, which in the preferred embodiment is 10 percent or less, a third adjustable time delay, which in the preferred embodiment is 10 seconds, is initiated. If the reserve capacity stays below the second predetermined level for the duration of the third adjustable time delay, UPS paralleling switchgear 370 initiates the starting and paralleling of the next motor-generator 1010 in sequence. If, during the third time delay period, the on-line reserve capacity decreases to 0 or less (signifying bus overload), the third time delay is bypassed, and the next motor-generator 1010 in sequence is immediately started and paralleled on UPSSB bus 850. If the next motor-generator 1010 in the sequence is unavailable or fails to synchronize, UPS paralleling switchgear 380 automatically starts the next motor-generator 1010 in sequence.

If, while operating in the load demand mode, one of UPS modules 360 fails, the failed UPS module 360 is removed from UPSSB bus 850. If this occurs, all idle motor-generators 1010 are started and paralleled. The stabilization time delay shall be energized after all available sets have been connected to the bus and, upon its expiration, load demand operation is resumed.

In a preferred embodiment of the present invention, two PLCs are used to coordinate the overall generator and load control functions of UPS paralleling switchgear 380. Each PLC monitors and controls the performance of the individual microprocessor-based control modules within each motor-generator 1010 in each UPS module 360 as would be apparent.

Ring Switchgear

Figure 9:
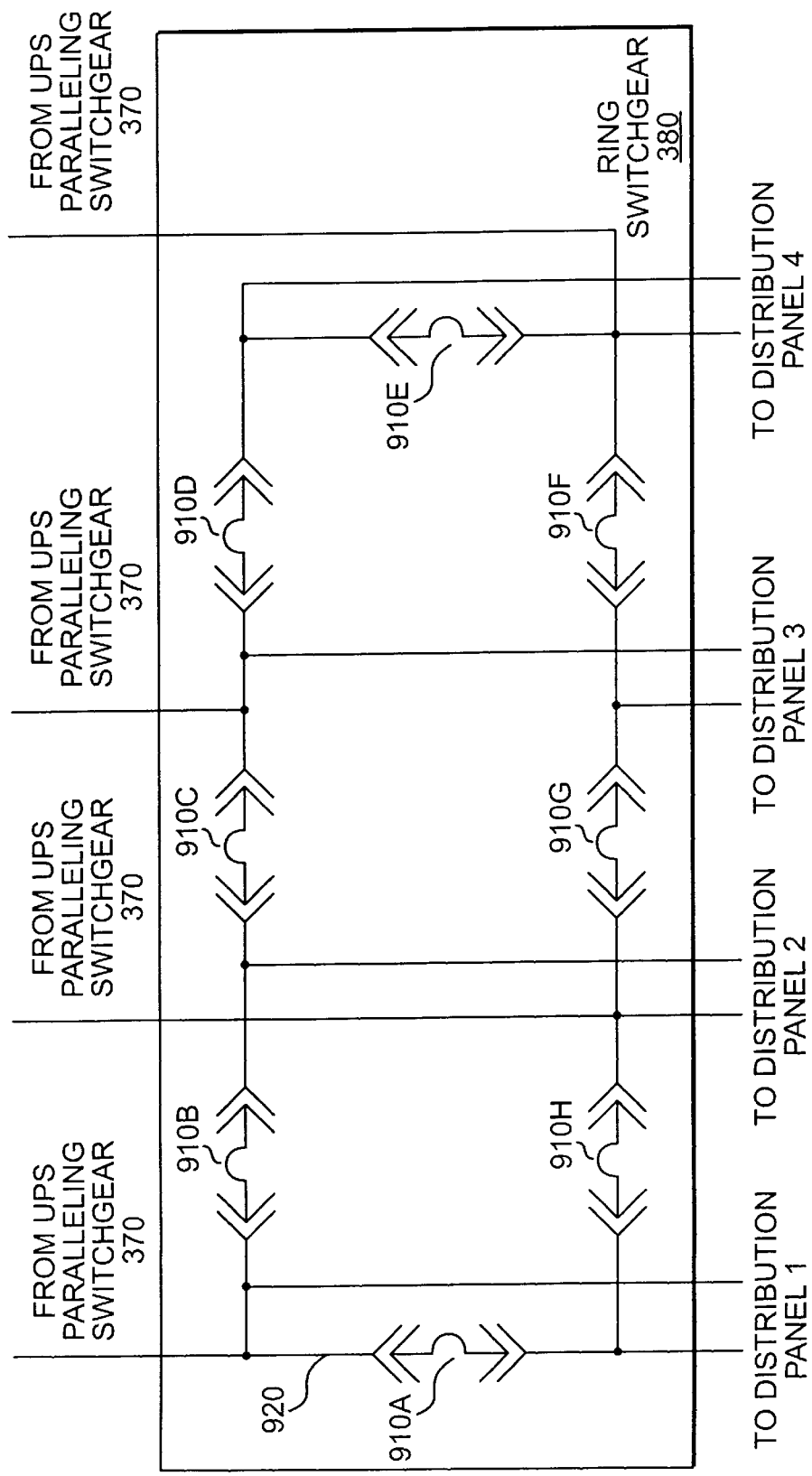
FIG. 9 illustrates circuit connections for a ring switchgear according to one embodiment of the present invention.

FIG. 9 illustrates ring switchgear 380 in further detail. Ring switchgear 380 includes a ring bus 920 and a plurality of ring bus breakers 910 (shown as ring bus breakers 910A–H). Ring bus breakers 910 allow various loads in critical load 230 to be isolated without disrupting the power supplied to the remaining critical load 230. As illustrated in FIG. 9, ring bus 920 is powered at various different points from different UPS modules 360. Furthermore, ring bus 920 supplies critical load 230 from at least two separate points which provide additional isolation and maintenance capabilities.

In a preferred embodiment of the present invention, each of ring bus breakers 910 includes a circuit breaker without an overload element and a differential relay that senses current on both sides of the circuit breaker. In normal operation, the current sensed on each side of the circuit breaker would be roughly equivalent to one another as would be expected. However, in the event of failure, the current on one side of the circuit breaker might be significantly higher than that on the other side of the circuit breaker. When this occurs, the differential relay causes various ring bus breakers 910 in ring bus 920 to open thereby isolating the failure without shutting down power to the entire critical load 230.

In a preferred embodiment of the present invention, ring bus 920 is expandable to accommodate an additional two UPS modules 360 and their associated critical loads 230. This expansion is designed to occur without interrupting power to the existing critical load 230.

Distribution Panels

Figure 11:
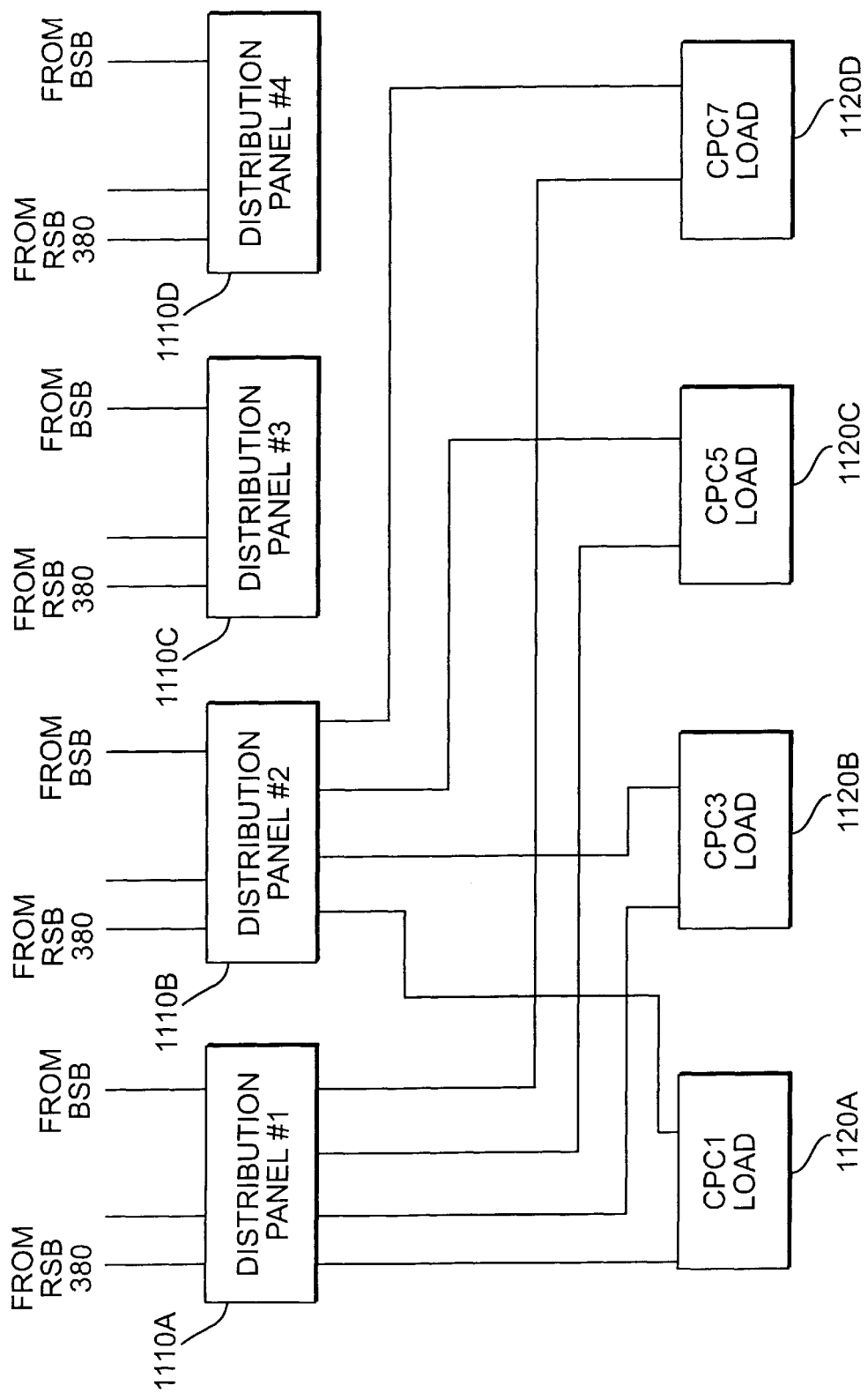
FIG. 11 illustrates a critical load according to one embodiment of the present invention.

FIG. 11 illustrates a preferred embodiment of critical load 230 in further detail. In this preferred embodiment of the present invention, critical load 230 comprises a plurality of distribution panels 1110 (shown as 1110A–D in FIG. 11) and a plurality of loads 1120 (shown as 1120A–D in FIG. 11). As would be apparent, other combinations, configurations, or loads included in critical load 230 are available depending upon various design considerations and practical applications limited only by the common need to have a supply of interruptible power. In this preferred embodiment of the present invention, critical load 230 as illustrated in FIGS. 11, 12 and 13 represents the load associated with the computers and other equipment that control, maintain, and record the transactions and information associated with the NASDAQ stock market.

As shown in FIG. 11, each distribution panel 1110 receives power from ring bus switchgear 380 via two separate feeds. As discussed above, these feeds originate from distinct and separate locations on ring bus 920 for purposes of isolation and maintenance. This ensures that distribution panel 1110 receives power even if a portion of ring bus 920 goes offline or one of the feeds fails. In a preferred embodiment of the present invention, these two feeds include cable protectors that operate similar to a fuse in the event that the feed shorts. Each distribution panel 1110 also includes a feed from the bypass switchboard which is discussed in further detail below.

As illustrated in FIG. 11, distribution panels 1110A and 1110B each feed four loads 1120. In particular, distribution panels 1110A and 1110B provide separate feeds to each load 1120A, load 1120B, load 1120C, and load 1120D. In a preferred embodiment of the present invention, each distribution panel 1110 feeds a total of eight loads 1120. Although not illustrated in FIG. 11, distribution panels 1110C and 1110D each provide separate feeds to an additional eight loads 1120 not illustrated. Thus, in a preferred embodiment of the present invention, the four distribution panels 1110 provide power to a total of sixteen loads 1120 with each load 1120 receiving power from two separate distribution panels 1110. Various other arrangements and numbers of distribution panels 1110 and loads 1120 could be used as would be apparent.

Figure 12:
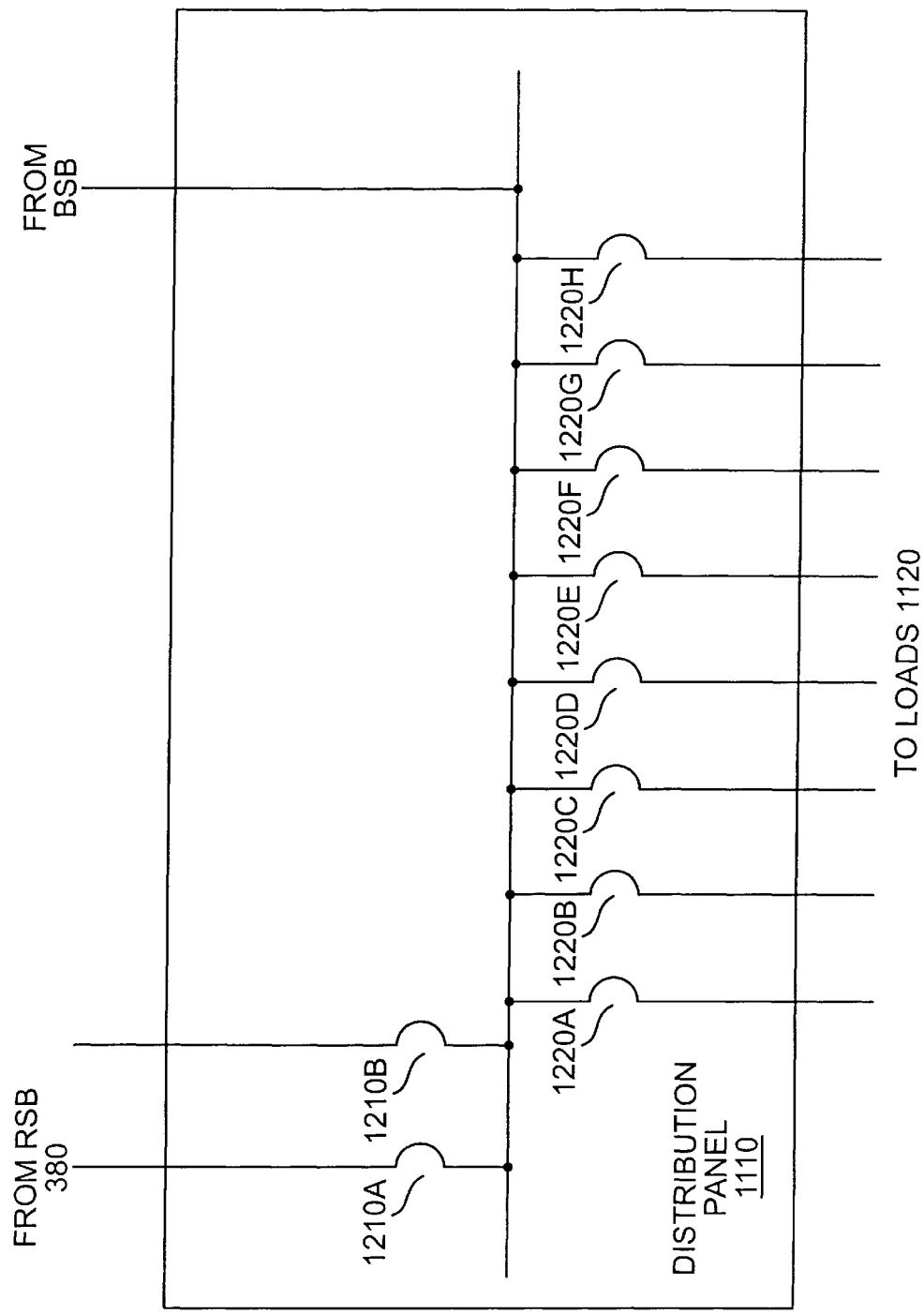
FIG. 12 illustrates a distribution panel according to one embodiment of the present invention.
Figure 13:
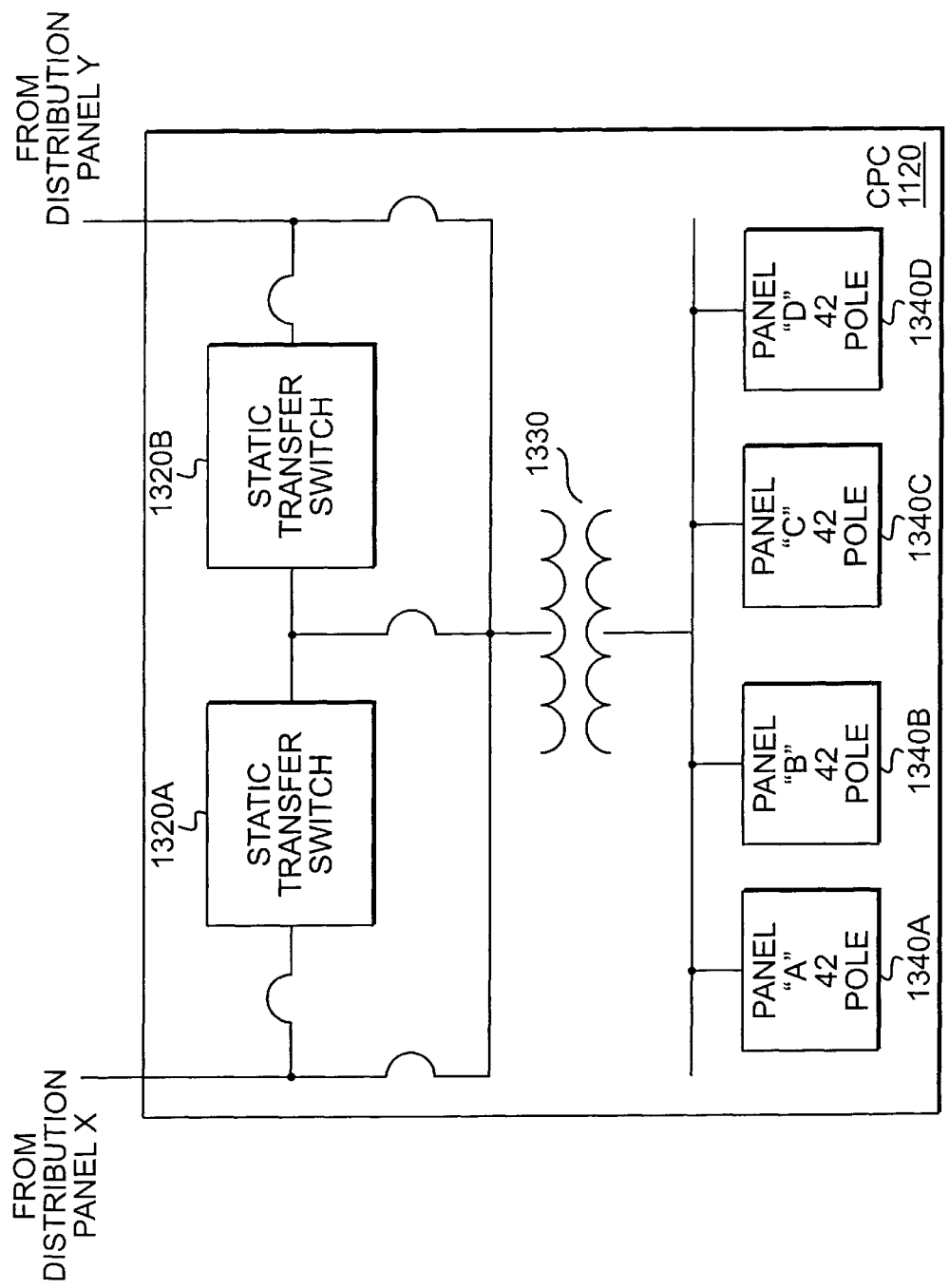
FIG. 13 illustrates a computer data center according to one embodiment of the present invention.

FIG. 12 illustrates a preferred embodiment of distribution panel 1110 in further detail. Distribution panel 1110 includes two breakers 1210 (shown as breakers 1210A–B) which connect the distribution bus to ring switchgear 380 (and to ring bus 920). These breakers are controllable in that they allow the distribution panel 1110 to be taken offline from ring bus 920 for servicing and maintenance. They also allow distribution panel to be removed from ring bus 920 and coupled to the bypass source as discussed below. Distribution panel 1110 also includes eight load breakers 1220 (shown as load breakers 1220A–H) These load breakers 1220 connect the distribution bus to eight loads 1120.

Computer Panel Circuit

FIG. 13 illustrates a preferred embodiment of load 1120 in further detail. In this preferred embodiment of the present invention, load 1120 is a computer data center (CDC) 1120. In particular, each CDC 1120 includes two static transfer switches 1320 (shown as static transfer switches 1320A–B), a step-down transformer 1330, and four individual loads 1340 (shown as individual loads 1340A–D).

Each CDC 1120 receives power from two separate distribution panels 1110 (shown generically as distribution panel X and distribution panel Y). Static transfer switches 1320 operate in conjunction with one another so that power from only one of distribution panels 1110 actually reaches individual loads 1340. If the distribution panel 1110 which is driving individual loads 1340 fails, static transfer switches 1320 immediately operate so that individual loads 1340 are transferred to the other distribution panel 1110 without interrupting the power to individual loads 1340 as would be apparent.

Bypass Switchboard

A preferred embodiment of the present invention includes a bypass switchboard coupled between first secondary main switchboard 340A and distribution panels 1110. In the event of a catastrophic failure to UPS modules 360, UPS paralleling switchgear 370, and/or ring bus 920, power is provided directly from a utility source 110 to critical load 230 via the bypass switchboard. Such a catastrophic failure would be one in which the various mechanisms implemented in UPS system 300 as discussed above where unavailable. Thus, the bypass switchboard is used as a last resort to maintain power to critical load 230. Of all the elements of UPS system 300, the bypass switchboard is the only one not to have automatic operation.

The bypass switchboard is not to be confused with the bypass operation of UPS modules 360 in which merely motor-generators 1010 are bypassed and power is provided from utility sources 110 to UPS paralleling switchgear 370 while motor-generators 1010 are serviced or brought back online.

In particular, bypass switchboard must be brought online manually. When, for example, ring bus 920 fails so that none of critical load 230 receives any power, an operator wishing to restore power to critical load 230 would first open each of breakers 1210 so that distribution panels 1110 are completely removed from ring bus 920. Then, a main BSB breaker which couples a BSB bus to one of utility sources 110 is closed followed by the closing of optional breakers to the individual distribution panels 1110. In a preferred embodiment of the present invention, the main BSB breaker is interlocked with breakers 1210 so that the main BSB breaker cannot close unless each of breakers 1210 is opened. This prevents an inadvertent coupling of critical load 230 to both ring bus 920 and utility sources 110.

When, for example, the operation of ring bus 920 is restored, the transfer back to normal operation occurs as a "closed transition." In other words, the opening of the main BSB breaker happens at the same time with the closing of breakers 1210. In particular, once ring bus 920 is brought back online and has assumed critical load 230, these breakers are switched in parallel to avoid an interruption in power to critical load 230 as the source of power is transferred from utility source 110 back to ring bus 920.

Interlocks

In a preferred embodiment of the present invention, all feeder breakers on secondary main switchboards 340, switchboards 350, and UPS output breakers 810 to UPS paralleling switchgear 370 will be controlled by generator paralleling switchgear 330.

In a preferred embodiment of the present invention, main breaker 510A of first secondary main switchboard 340A and main breaker 510B of second secondary main switchboard 340B are electrically interlocked with generator paralleling switchgear 330 for reclose so that main breakers 510 will only be permitted to reclose upon a signal from generator paralleling switchgear 330.

UPS output breakers 810 and UPS load bank breakers 840 are interlocked to prevent UPS load bank breaker 840 from closing unless the corresponding UPS output breaker 810 is open.

Generator load bank breaker 430 is interlocked with generator paralleling switchgear output breakers 440 so that it cannot be closed unless output breakers 440 are open. Generator load bank breaker 430 will be tripped by generator paralleling switchgear 330 in the event of loss of utility power.

BSB feeder breaker 540 is interlocked with all UPS feeder breakers 620,720 on switchboards 350 so that the BSB feeder breaker 540 cannot be closed unless all UPS feeder breakers 620, 720 are open.

Operation of UPS System 300

The operation of UPS system 300 is now discussed. In a preferred embodiment of the present invention, UPS system 300 includes at least the following operational modes: a normal mode, a single utility source mode, a generator mode, and a bypass mode. These modes ensure that an uninterruptible supply of power is provided to critical load 230.

In a preferred embodiment of the present invention, UPS system 300 features N+2 redundancy and has a power capacity of 1500 KVA with potential expansion to 3000 KVA, although the present invention could be used to provide other power capacities as would be apparent from reading this description. As illustrated in FIG. 3, in a preferred embodiment, UPS system 300 includes four UPS modules 360, any two of which can completely service critical load 230 leaving the other two as redundant backups. UPS system 300 is expandable to include two additional UPS modules 360 as well. UPS modules 360 are connected in parallel via UPSSB 370 so that each can equally share critical load 230.

Each UPS module 360 includes a rotary motor-generator and a battery backup which is able to drive motor-generator for fifteen minutes at full load in the event that power is unavailable from utility sources 110 or generators 320.

Normal Operation

In a preferred embodiment of the present invention, during normal operation, power is fed from utility sources 110 to secondary main switchboards 340. Main breakers 510 and feeder breakers 520 are closed and alternate feeder breakers 530 are open. In this manner, first secondary switchboard 340A supplies power to first switchboard 350A and second secondary switchboard 340B supplies power to second switchboard 350B as well as other loads not shown as would be apparent.

UPS output breakers 810 receive power through motor-generators 1010 and deliver power to UPSSB bus 850. UPSSB bus 850 distributes conditioned power through ring bus 920 to critical load 230. UPS paralleling switchgear 370 controls the output of UPS modules 360 to share the load equally to ring bus 920 even though they are supplied by different utility sources 110 as is described above. UPS paralleling switchgear 370 also monitors load and controls the number of UPS modules 360 feeding ring bus 920 depending on the magnitude of the load served.

Single Utility Source Operation

If either one of utility sources 110 fails, main breaker 510 corresponding to the failed utility source 110 will be opened and alternate feeder breaker 530 will be closed. In this manner, both first switchboard 350A and second switchboards 350B will receive power from a single utility source 110.

For example, if utility source 110A fails, in a preferred embodiment of the present invention, main breaker 110A in first secondary switchboard 340A would open and alternate feeder breaker 530A would close. In this example, power from utility source 110B would be fed through secondary main switchboard 340B to second switchboard 350B as normal and then to first secondary switchboard 340A via the closed alternate feeder breaker 530A. A similar operation occurs when utility source 110B fails. Various other wiring and breaker combinations could be used to effect the same purpose as would be apparent.

Generator Operation

If both utility sources 110 fail, main breakers 510 of secondary main switchboards 340 will both open and all generators 320 will start by, for example, receiving a signal from a bus undervoltage relay. Other mechanisms for detecting interruption of power from both utility sources 110 and starting generators 320 could be used as would be apparent.

The first generator 320 reaching voltage and frequency will close to generator bus 450 and accept the first priority load and other priorities to 85 percent of nominal capacity. The remaining available generators 320 will close to generator bus 450 when they reach voltage, frequency, phase and phase angle with the first generator 320. The remaining priority loads will be added as generator capacity becomes available. All generators 320 will share the load equally.

In a preferred embodiment of the present invention, if the available generator capacity exceeds the load by 125 percent of nominal capacity, one of generators 320 will be removed from generator bus 450 and will begin its cool-down mode. If the load exceeds 80 percent of the available generator capacity, the load will be automatically shed in the inverse order of the priority. If any generators 320 go into overspeed or underfrequency, all loads, except life safety loads, will be immediately shed until generators 320 stabilize.

In the preferred embodiment of the present invention, the loads are prioritized as follows: 1) life safety functions, 2) one chiller, one cooling tower, and associated chilled water pumps, condenser water pumps, and computer data center cooling pumps, 3) computer data center room air conditioning (CRAC) units, 4) one UPS module 360, 5) a UPS room air handling units, the remaining UPS modules 360, 6) 25 percent of any office load, 7) any other loads.

Once main breakers 510 are opened, they shall be locked out until power becomes available from at least one of utility sources 110. In a preferred embodiment of the present invention, generator paralleling switchgear 330 locks out main breakers 510 of secondary main switchboard 340 and resets them as well.

Restoration of Utility Sources

Once power becomes available from both utility sources 110, generator paralleling switchgear 330 will check voltage, frequency and phase of the power provided by utility sources 110 and begin synchronizing generators bus 450 with utility sources 110. Main breakers 510 of secondary main switchboards 340 will be closed by generator paralleling switchgear 330 when generator bus 450 is synchronized with utility sources 110.

Once main breakers 510 are closed, generator paralleling switchgear breakers 440 will open and generators 320 will be placed in the cool-down mode, remaining in synchronization on generator bus 450 with utility sources 110. If another interruption of power from utility sources 110 occurs during this cool-down mode, generators 320 will immediately assume all priority loads.

Bypass Operation

In the event that UPS modules 360 are not able to handle critical load 230 because an insufficient number of UPS modules 360 are available, UPS system 300 will transfer to bypass operation. This mode of operation discussed here is not to be confused with the operation of the bypass switchboard used during a catastrophic failure of ring bus 920 that was discussed above.

As mentioned above, each UPS module 360 includes a UPS bypass line which couple switchboard 350 to ring switchgear 380 through UPS bypass breakers 830. In one embodiment of the present invention, a UPS bypass line is used to bypass a particular UPS module 360 when that module fails or is brought offline. In this embodiment, power is provided from a bypass source, such as utility sources 110 or generators 320, to UPS bus 850. To some extent, this operation may not be desirable particularly if other UPS modules 360 are available to handle critical load 230.

Thus, in a preferred embodiment of the present invention, the UPS bypass lines are not individually used to bypass a particular UPS module 360. Rather, when the available UPS modules 360 are unable to handle critical load 230, all the UPS bypass lines are enabled to bypass all UPS modules 360.

Conclusion

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A system for providing an uninterruptible supply of power to a critical load comprising:
a first secondary main switchboard electrically coupled to a first utility source via a first main breaker, said first main breaker normally closed;
a second secondary main switchboard electrically coupled to a second utility source via a second main breaker, said second main breaker normally closed;
a first switchboard electrically coupled to said first secondary main switchboard via a first feed and a first feed breaker and electrically coupled to said second secondary main switchboard via a first alternate feed and a first alternate feed breaker, said first feed breaker normally closed and said first alternate feed breaker normally opened;
a second switchboard electrically coupled to said second secondary main switchboard via a second feed and a second feed breaker, and electrically coupled to said first secondary main switchboard via a second alternate feed and a second alternate feed breaker, said second feed breaker normally closed and said second alternate feed breaker normally opened;
a first uninterruptible power supply (UPS) module electrically coupled to said first switchboard via a first UPS feed and a first UPS feed breaker, said first UPS feed breaker normally closed;
a second UPS module electrically coupled to said second switchboard via a second UPS feed and a second UPS feed breaker, said second UPS feed breaker normally closed;
a UPS paralleling switchgear electrically coupled to said first UPS module via a first UPS output line, and electrically coupled to said second UPS module via a second UPS output line, wherein said UPS paralleling switchgear combines power from said first UPS module with power from said second UPS module so that said first UPS module and said second UPS module equally share the critical load.

2. The system of claim 1, further comprising:
a ring bus electrically coupled between said UPS paralleling switchgear and the critical load that receives said combined power and provides said combined power to the critical load via at least two separate feeds.

3. The system of claim 1, wherein said first UPS module comprises a first motor-generator electrically coupled to said first UPS feed that receives input power from said first utility source and that generates output power for the critical load, and
wherein said second UPS module comprises a second motor-generator electrically coupled to said second UPS feed that receives input power from said second utility source and that generates output power for the critical load.

4. The system of claim 3, wherein said input power from said first utility source is out-of-phase with said input power from said second utility source; and
wherein said UPS paralleling switchgear controls said first motor-generator and said second motor-generator so that said output power from said first motor-generator is substantially in-phase with said output power from said second motor-generator so that each motor-generator equally shares the critical load.

5. The system of claim 4, wherein each motor-generator is mechanically adjusted so that its output power is out-of-phase from its input power by a predetermined amount.

6. The system of claim 5, wherein said UPS paralleling switchgear controls an output voltage and an output frequency of each of said first motor-generator and said second motor-generator.

7. The system of claim 1, further comprising:
a third UPS module electrically coupled to said first switchboard via a third UPS feed and a third UPS feed breaker, said third UPS feed breaker normally closed; and
a fourth UPS module electrically coupled to said second switchboard via a fourth UPS feed and a fourth UPS feed breaker, said fourth UPS feed breaker normally closed;
wherein said UPS paralleling switchgear is electrically coupled to said third UPS module via a third UPS output line and electrically coupled to said fourth UPS module via a fourth UPS output line,
wherein said UPS paralleling switchgear combines power from at least two of said first UPS module, said second UPS module, said third UPS module, and said fourth UPS module so that each of said at least two UPS modules equally shares the critical load.

8. The system of claim 7, wherein said first UPS module comprises a first motor-generator electrically coupled to said first UPS feed that receives input power from said first utility source and that generates output power for the critical load;
wherein said second module comprises a second motor-generator electrically coupled to said second UPS feed that receives input power from said second utility source and that generates output power for the critical load;
wherein said third UPS module comprises a third motor-generator electrically coupled to said third UPS feed that receives input power from said first utility source and that generates output power for the critical load; and
wherein said fourth module comprises a fourth motor-generator electrically coupled to said fourth UPS feed that receives input power from said second utility source and that generates output power for the critical load.

9. The system of claim 8, wherein said UPS paralleling switchgear controls said first motor-generator, said second motor-generator, said third motor-generator, and said fourth motor generator so that said output power from any of said motor-generators is substantially in-phase with said output power from any other of said motor-generators so that said motor-generators equally share the critical load.

10. The system of claim 8, further comprising:
a first UPS output breaker electrically coupled between an output of said first UPS module and said first UPS feed;
a second UPS output breaker electrically coupled between an output of said second UPS module and said second UPS feed;
a third UPS output breaker electrically coupled between an output of said third UPS module and said third UPS feed; and
a fourth UPS output breaker electrically coupled between an output of said fourth UPS module and said fourth UPS feed;
wherein each of said UPS output breakers are controlled by said UPS paralleling switchgear so said output powers from said motor-generators are matched before said UPS output breakers are closed.

11. The system of claim 7, further comprising:
a first UPS bypass electrically coupled between said first switchboard and said UPS paralleling switchgear for bypassing said first UPS module;
a second UPS bypass electrically coupled between said second switchboard and said UPS paralleling switchgear for bypassing said second UPS module;
a third UPS bypass electrically coupled between said first switchboard and said UPS paralleling switchgear for bypassing said third UPS module;
a fourth UPS bypass electrically coupled between said second switchboard and said UPS paralleling switchgear for bypassing said fourth UPS module;
wherein each of said UPS bypasses are controlled by said UPS paralleling switchgear so that said UPS paralleling switchgear receives power from a bypass source in the event that said UPS modules are unable to handle the critical load.

12. The system of claim 1, further comprising:
an engine generator; and
a generator paralleling switchgear electrically coupled to said first secondary main switchboard via a first feeder breaker, electrically coupled to said second secondary main switchboard via a second feeder breaker, and electrically coupled to said generator via a generator breaker,
wherein said generator paralleling switchgear controls said engine generator, said first and second feeder breakers, and said generator breaker to provide power from said generator to at least one of said first and second secondary switchboards in the event that power from both said first and second utility sources becomes interrupted.

13. The system of claim 1, wherein if power from said first utility source becomes interrupted, said first main breaker is opened and said second alternate feed breaker is closed so that said first secondary main switchboard receives power from said second utility source via said second alternate feed through said second switchboard.

14. The system of claim 1, wherein if power from said second utility source becomes interrupted, said second main breaker is opened and said first alternate feed breaker is closed so that said second secondary main switchboard receives power from said first utility source via said first alternate feed through said first switchboard.

15. A system for providing an uninterruptible power supply (UPS) to a critical load comprising:
first secondary main switchboard coupled to a first utility source;
second secondary main switchboard coupled to a second utility source;
first switchboard coupled to said first secondary main switchboard;
second switchboard coupled to said second secondary main switchboard;
first UPS module coupled to said first switchboard;
second UPS module coupled to said second switchboard; and
UPS paralleling switchgear coupled between said first and second UPS modules and said critical load;
wherein each UPS module comprises a motor generator mechanically preadjusted so that its power output is out-of-phase from its received power.

16. A system for providing an uninterruptible supply of power to a critical load comprising:
a first uninterruptible power supply (UPS) module electrically coupled to a first utility source that receives power from the first utility source and that generates a first output power;
a second UPS module electrically coupled to a second utility source that receives power from the second utility source and that generates a second output power, wherein the power from the first utility source is out-of-phase with the power from the second utility source;
a paralleling bus electrically coupled to said first and second UPS modules and to the critical load;
a controller that controls said first UPS module and said second UPS module so that the phase of said first output power is substantially the same as the phase of said second output power when said first and second output power are combined on said paralleling bus; and
a ring bus electrically coupled between said paralleling bus and the critical load that receives said combined power from said paralleling bus and that provides said combined power to the critical load via at least two separate feeds, wherein said first UPS module comprises a first motor-generator electrically coupled to said first utility source that receives power from said first utility source and that generates said first output power, wherein said second UPS module comprises a second motor-generator electrically coupled to said second utility source that receives power from said second utility source and that generates said second output power, and wherein each motor-generator is mechanically preadjusted so that its output power is out-of-phase from its received power by a predetermined amount.

17. The system of claim 16, wherein said controller controls a frequency, voltage, and phase of said first output power and a frequency, voltage, and phase of said second output power so that when said output powers are combined on said paralleling bus, said first motor-generator and said second motor-generator equally share the critical load.

18. A method for providing an uninterruptible supply of power to a critical load, the method comprising the steps of:

receiving power from a first utility source at a first uninterruptible power supply (UPS) module;

receiving power from a second utility source at a second UPS module;

generating a first output power from said power received from the first utility source using said first UPS module;

generating a second output power from said power received from the second utility source using said second UPS module;

controlling said second UPS module so that said second output power is substantially in phase with said first output power;

combining said first output power and said second output power; and providing said combined powers to the critical load, wherein said step of generating said first output power comprises the step of generating said first output power from said power received from the first utility source using a first motor-generator in said first UPS module, wherein said step of generating said second output power comprises the step of generating said second output power from said power received from the second utility source using a second motor-generator in said second UPS module, wherein said step of receiving power from the second utility source comprises the step of receiving power from the second utility source that is out-of-phase with the power received from the first utility source, wherein said step of controlling said second UPS module comprises the step of controlling said second motor-generator so that said second output power is substantially in phase with said first output power, and wherein said method further comprises the step of preadjusting said second motor-generator so that said second output power generated by said second motor-generator is out-of-phase with the power received from the second utility source by a predetermined amount.

* * * * *